(12) United States Patent
Leibig et al.

(10) Patent No.: US 12,384,102 B2
(45) Date of Patent: Aug. 12, 2025

(54) METHOD FOR THREE DIMENSIONAL PRINTING OF PARTS WITH OVERHANG

(71) Applicant: CHROMATIC 3D MATERIALS, INC., Golden Valley, MN (US)

(72) Inventors: Cora Leibig, Maple Grove, MN (US); Michael Garrod, Minnetrista, MN (US); Garth Benson, Burnsville, MN (US); Barthel Engendahl, Hillensberg (DE); Sherilyn Ch'ng, Minneapolis, MN (US); Matthias Hoffman, Aachen (DE); Theresa Leibig, Maple Grove, MN (US)

(73) Assignee: CHROMATIC 3D MATERIALS, INC.

( * ) Notice: Subject to any disclaimer, the term of this patent is extended or adjusted under 35 U.S.C. 154(b) by 112 days.

(21) Appl. No.: 17/999,223

(22) PCT Filed: May 21, 2021

(86) PCT No.: PCT/US2021/033541
§ 371 (c)(1),
(2) Date: Nov. 18, 2022

(87) PCT Pub. No.: WO2021/237016
PCT Pub. Date: Nov. 25, 2021

(65) Prior Publication Data
US 2023/0330918 A1    Oct. 19, 2023

Related U.S. Application Data

(60) Provisional application No. 63/028,174, filed on May 21, 2020.

(51) Int. Cl.
*B29C 64/118*    (2017.01)
*B29C 64/106*    (2017.01)
(Continued)

(52) U.S. Cl.
CPC .......... *B29C 64/118* (2017.08); *B33Y 10/00* (2014.12); *B33Y 70/00* (2014.12); *B29K 2075/00* (2013.01)

(58) Field of Classification Search
CPC ..... B29C 64/118; B29C 64/106; B29C 64/40; B29C 64/209; B29C 64/227; B33Y 10/00;
(Continued)

(56) References Cited

U.S. PATENT DOCUMENTS 6,454,972 B1    9/2002    Morisette et al.
8,791,184 B2    7/2014    Meng et al.
(Continued)

FOREIGN PATENT DOCUMENTS

CA    2295548 A1    1/1999
CN    106626369 A    5/2017
(Continued)

OTHER PUBLICATIONS

Rios et al., Evaluation of Advanced Polymers for Additive Manufacturing, CRADA Final Report NFE-14-05252, Oak Ridge National Laboratory, Sep. 8, 2017, pp. 1-22.

*Primary Examiner* — Galen H Hauth
*Assistant Examiner* — Baileigh Kate Darnell
(74) *Attorney, Agent, or Firm* — Robert S. Lelkes

(57) ABSTRACT

A three-dimensional (3D) object production process comprising providing a thermoset printing apparatus comprising a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more
(Continued)

processors and coupled to the extruded thermoset printing apparatus, and depositing the thermosetting material to form the 3D object, wherein the depositing comprises depositing a first layer of thermosetting material and depositing an at least second layer of thermosetting material, wherein the beads of thermosetting material in the at least second layer are offset from the beads of thermosetting material in the first layer.

20 Claims, 6 Drawing Sheets

(51) Int. Cl.
  *B29K 101/10* (2006.01)
  *B33Y 10/00* (2015.01)
  *B33Y 70/00* (2020.01)
  *B29K 75/00* (2006.01)

(58) Field of Classification Search
  CPC .... B33Y 30/00; B33Y 70/00; B29K 2075/00; B29K 2101/10
  See application file for complete search history.

(56) References Cited

U.S. PATENT DOCUMENTS

| | | |
|---|---|---|
| 9,688,024 B2 | 6/2017 | Stava |
| 9,707,717 B2 | 7/2017 | Sand |
| 9,844,917 B2 | 12/2017 | Burhop et al. |
| 10,220,569 B2 | 3/2019 | Schmidt |
| 10,414,096 B2 | 9/2019 | Yoshida et al. |
| 10,639,842 B2 | 5/2020 | Leibig et al. |
| 11,065,816 B2 | 7/2021 | Leibig et al. |
| 11,254,047 B2 | 2/2022 | Leibig et al. |
| 11,407,180 B2 | 8/2022 | Moosberg et al. |
| 11,511,485 B2 | 11/2022 | Mojdeh et al. |
| 2002/0111707 A1 | 8/2002 | Li et al. |
| 2003/0004599 A1 | 1/2003 | Herbak |
| 2015/0040428 A1 | 2/2015 | Davis et al. |
| 2015/0352787 A1 | 12/2015 | Humbert et al. |
| 2016/0263822 A1 | 9/2016 | Boyd, IV et al. |
| 2017/0066186 A1 | 3/2017 | Gardiner |
| 2018/0079141 A1 | 3/2018 | Yoshida et al. |
| 2018/0104922 A1* | 4/2018 | Büsgen ............... B33Y 10/00 |
| 2018/0147785 A1 | 5/2018 | Bayer et al. |
| 2018/0264750 A1 | 9/2018 | Tierney et al. |
| 2018/0370125 A1 | 12/2018 | Rolland et al. |
| 2019/0037969 A1* | 2/2019 | Busbee ............. A43B 23/0245 |
| 2019/0168446 A1 | 6/2019 | Leibig et al. |
| 2019/0337235 A1 | 11/2019 | Moosberg et al. |
| 2020/0046062 A1 | 2/2020 | Perillo et al. |
| 2020/0062952 A1 | 2/2020 | Nguyen et al. |
| 2020/0399487 A1* | 12/2020 | Fenn .................... B33Y 70/00 |

FOREIGN PATENT DOCUMENTS

| | | |
|---|---|---|
| EP | 2955004 A1 | 12/2015 |
| EP | 3124217 A2 | 2/2017 |
| EP | 3307839 B1 | 4/2018 |
| JP | 2018049854 A | 3/2018 |
| WO | 0020215 A1 | 4/2000 |
| WO | 2006044305 A1 | 4/2006 |
| WO | 2016085914 A1 | 6/2016 |
| WO | 2016085992 A1 | 6/2016 |
| WO | 2016086216 A1 | 6/2016 |
| WO | 2016191329 A1 | 12/2016 |
| WO | 2017039790 A1 | 3/2017 |
| WO | 2019030267 A1 | 2/2019 |

* cited by examiner

METHOD FOR THREE DIMENSIONAL PRINTING OF PARTS WITH OVERHANG

This invention was made with Government support under NSF Phase II Grant 1853265 awarded by the National Science Foundation. The Government has certain rights to this invention.

FIELD

The present disclosure relates to 3D additive manufacturing methods of parts with overhang. The application also relates to a 3D object with overhang prepared by 3D additive manufacturing.

BACKGROUND

Fused filament fabrication (FFF), also referred to as thermoplastic extrusion, plastic jet printing (PJP), fused filament method (FFM), or fusion deposition modeling, is an additive manufacturing process wherein a material is extruded in successive layers onto a platform to form a three-dimensional (3D) product. Typically, FFF uses a melted thermoplastic material that is extruded onto a platform. Three-dimensional printing (3D printing) sometimes uses support structures that are easily dissolved or removed from the part after printing.

Disadvantages of existing FFF technology using thermoplastics include single material property printing, limited print-direction strength, limited durability, and limited softness. Thermosetting materials have generally not been used in FFF because prior to cure, the monomers are low viscosity liquids, and upon deposition, the curing liquid flows or breaks into droplets, resulting in finished parts of low quality and undesirably low resolution. Attempts to print with thermosetting materials has required addition of fillers (such as inorganic powders or polymers) to induce thixotropic behavior in the resin before it is fully cured. These solutions adversely affect the final properties of the printed part. Other problems include poor resolution control in the printed part and frequent clogging of mixing systems.

3D additive manufacturing of objects having overhang is also limited. Current methods require use of a support that provides stability to the object as it is being printed. Use of a support requires additional cost and material, can be difficult to remove after printing, and can limit the geometry of the object.

SUMMARY

The present disclosure is related to 3D printing methods and 3D printed objects.

The present disclosure is directed to a three-dimensional (3D) object production process comprising: providing a thermoset printing apparatus comprising: a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a first layer of thermosetting material and depositing an at least second layer of thermosetting material, wherein the beads of thermosetting material in the at least second layer are offset from the beads of thermosetting material in the first layer.

In certain embodiment, the 3D object production process comprises depositing an at least third layer of thermosetting material, wherein the beads of thermosetting material in the at least third layer are offset from the beads of thermosetting material in the second layer.

In certain embodiment, the 3D object production process comprises a plurality of layers of thermosetting material.

In certain embodiments, the 3D object production comprises a time per layer of the thermosetting material is from about 10 seconds to about 10 minutes. In certain embodiments of the 3D object production process, the time per layer of the thermosetting material is from about 20 seconds to about 5 minutes. In certain embodiments of the 3D object production process, the time per layer of the thermosetting material is from about 30 seconds to about 3 minutes. In certain embodiments of the 3D object production process, the time per layer of the thermosetting material is from about 30 seconds to about 2 minutes. In certain embodiments of the 3D object production process, the time per layer of the thermosetting material is from about 30 seconds to about 60 seconds.

In certain embodiments of the 3D object production process, the beads of thermosetting material in the at least second layer are about 5 degrees offset from the beads of thermosetting material in the first layer. In certain embodiments of the 3D object production process, the beads of thermosetting material in the at least second layer are about 10 degrees offset from the beads of thermosetting material in the first layer. In certain embodiments of the 3D object production, the beads of thermosetting material in the at least second layer are about 20 degrees offset from the beads of thermosetting material in the first layer. In certain embodiments of the 3D object production process, the beads of thermosetting material in the at least second layer are about 30 degrees offset from the beads of thermosetting material in the first layer. In certain embodiments of the 3D object production, the beads of thermosetting material in the at least second layer are about 40 degrees offset from the beads of thermosetting material in the first layer. In certain embodiments of the 3D object production process, the beads of thermosetting material in the at least second layer are about 50 degrees offset from the beads of thermosetting material in the first layer.

In certain embodiments of the 3D object production process, each layer of the plurality of layers is offset from the previously deposited layer. In certain embodiments of the 3D object production process, a majority of the layers of the plurality of layers are offset from their previously deposited layers. In certain embodiments of the 3D object production process, less than a majority of the layers of the plurality of layers are offset from their previously deposited layers.

In certain embodiments of the 3D object production process, the amount of offset in the beads of the first layer and the second layer is the same as the amount of offset in the beads of the second layer and the third layer. In certain embodiments of the 3D object production process, the amount of offset in the beads of the first layer and the second layer is different than the amount of offset in the beads of the second layer and the third layer. In certain embodiments of the 3D object production process, the amount of offset in the beads is the same for the plurality of layers. In certain embodiments of the 3D object production process, the amount of offset in the beads is different for the plurality of layers.

In certain embodiments, the 3D object production process comprises a support. In certain embodiments, the 3D object production process comprises depositing a support material during the depositing of the thermosetting material. In certain embodiments, the 3D object production process comprises depositing a support material before the depositing of the thermosetting material.

In certain embodiments of the 3D object production process, the support material is an olefinic material. In certain embodiments of the 3D object production process, the olefinic material comprises polyethylene and/or polypropylene. In certain embodiments, the support material is polylactic acid. In certain embodiments, the support material is poly vinyl alcohol or poly vinyl acetate. In certain embodiments, the support material is an applied silicone. In certain embodiments, the support material has a surface treatment or mold release agent to prevent adhesion.

In certain embodiments, the 3D object production process comprises removing the support. In certain embodiments, the 3D object production process comprises removing the support material by melting. In certain embodiments of the 3D object production process, the support is not removed and can remain within the object.

In certain embodiments of the 3D object production process, a portion of the 3D object comprises an overhang of at least about 10 degrees In certain embodiments of the 3D object production process, a portion of the 3D object comprises an overhang of at least about 20 degrees In certain embodiments of the 3D object production process, a portion of the 3D object comprises an overhang of at least about 30 degrees In certain embodiments of the 3D object production process, a portion of the 3D object comprises an overhang of at least about 40 degrees In certain embodiments of the 3D object production process, a portion of the 3D object comprises an overhang of at least about 50 degrees. In certain embodiments of the 3D object production process, a portion of the 3D object comprises an overhang of at least about 60 degrees. In certain embodiments of the 3D object production process, a portion of the 3D object comprises an overhang of at least about 70 degrees. In certain embodiments of the 3D object production process, a portion of the 3D object comprises an overhang of at least about 80 degrees.

It is to be understood that both the Summary and the Detailed Description are exemplary and explanatory only, and are not restrictive of the disclosure as claimed.

DETAILED DESCRIPTION

Figure 1:
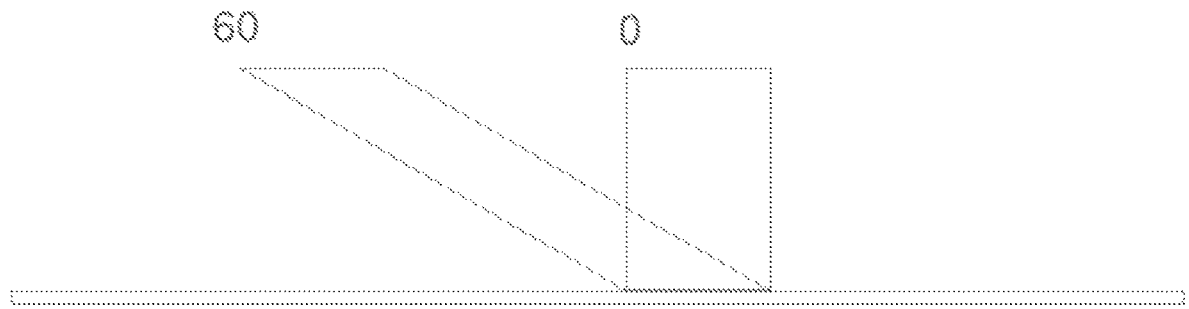
FIG. 1 depicts an overhang of 0° and an overhang of 60°.

Embodiments of the disclosure relate methods for 3D additive manufacturing and methods for 3D printing. Embodiments of the disclosure also relate to a 3D object prepared by 3D printing.

3D printing models allow for a wide variety of 3D object geometries, but 3D printing of 3D objects having overhang can lead to problems with stability and performance.

Embodiments of the disclosure unexpectedly overcome these problems. In certain embodiments, embodiments of the disclosure overcome these problems by depositing a layer of thermosetting material and then depositing a subsequent layer offset from the previous layer. In certain embodiments, embodiments of the disclosure overcome these problems by factoring in the extent of cure of the thermosetting material and selecting a time per layer before depositing subsequent layers of thermosetting material.

Embodiments of the disclosure can also achieve a 3D printed part with overhang by applying a minimum time per layer, a minimum residence time or maximum flow rate through the mixer, and/or a minimum volumetric flow rate per distance traveled by the printer tip.

By following embodiments of the disclosure, it is possible to 3D print objects having a high degree of overhang.

Embodiments of the disclosure relate to a three-dimensional (3D) object production process comprising providing a thermoset printing apparatus comprising a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a first layer of thermosetting material and depositing an at least second layer of thermosetting material, wherein the beads of thermosetting material in the at least second layer are offset from the beads of thermosetting material in the first layer.

The present disclosure also relates to a 3D object produced according to the disclosed methods.

Various examples and embodiments of the subject matter disclosed are possible and will be apparent to a person of ordinary skill in the art, given the benefit of this disclosure. In this disclosure reference to "some embodiments," "certain embodiments," "certain exemplary embodiments" and similar phrases each means that those embodiments are non-limiting examples of the inventive subject matter, and there may be alternative embodiments which are not excluded.

The articles "a," "an," and "the" are used herein to refer to one or more than one (i.e., to at least one) of the grammatical object of the article. By way of example, "an element" means one element or more than one element.

As used herein, the term "about" means±10% of the noted value. By way of example only, at least "about 50 seconds" could include from at least 45 seconds to and including at least 55 seconds.

The word "comprising" is used in a manner consistent with its open-ended meaning, that is, to mean that a given product or process can optionally also have additional features or elements beyond those expressly described. It is understood that wherever embodiments are described with the language "comprising," otherwise analogous embodiments described in terms of "consisting of" and/or "consisting essentially of" are also contemplated and within the scope of this disclosure.

As used herein, the term "additive manufacturing" means extruded printing of thermosetting material. Additive manufacturing can be used interchangeably with 3D printing.

As used herein, the terms "thermoset," "thermoset product," and "thermoset material" are used interchangeably and refer to the reaction product of at least two chemicals which form a covalently bonded crosslinked or polymeric network. In contrast to thermoplastics, a thermoset product described herein can irreversibly solidify or set.

As used herein, the term "thermosetting material" refers to a covalently bonded crosslinked or polymeric network that is still reactive, e.g., it can still have hydroxyl, amine, and/or isocyanate functionality that gives a measureable hydroxyl number, NH number, or NCO number in a titration. In one embodiment, a thermosetting material can have a viscosity below 3,000,000 cp. In one embodiment, thermosetting material can have a molecular weight of no greater than 100,000 g/mol.

Three-Dimensional (3D) Object Production Process

In certain embodiments, the present disclosure is directed a three-dimensional (3D) object production process comprising providing a thermoset printing apparatus comprising a mixing chamber to receive and mix at least a first reactive component and a second reactive component to provide a thermosetting material, an extrusion nozzle to deliver the thermosetting material to form a 3D object, at least one actuator coupled to the extrusion nozzle to move the extrusion nozzle when delivering the thermosetting material to form the 3D object, and a controller comprising one or more processors and coupled to the extruded thermoset printing apparatus, and depositing the thermosetting material to form the 3D object, wherein the depositing comprises depositing a first layer of thermosetting material and depositing an at least second layer of thermosetting material, wherein the beads of thermosetting material in the at least second layer are offset from the beads of thermosetting material in the first layer.

As used herein, the term "overhang" means a portion of an object where the dimensions of a layer exceed the dimensions of the layer below. An overhang angle is the angle of the profile from a layer to the layer below. A 90 degree overhang is a suspended horizontal layer. A 0 degree overhand is not an overhang, but is instead a vertical wall. An overhang can be an outward overhang or an inward overhang. An outward overhang increases a distance from a center point. An inward overhang decreases a distance from a center point.

As used herein, the term "offset" means a horizontal or x-axis difference in position compared to the previous layer. The offset can be used to form an inward overhang or an outward overhang.

Applicant has surprisingly discovered that by depositing a layer of thermosetting material and then depositing a subsequent layer offset from the previous layer, it is possible to 3D print objects having a high degree of overhang.

In certain embodiments, the process comprises any number of layers of thermosetting material. The present disclosure is in no way limited to a specific number of layers of thermosetting material, 3D printing can involve depositing many layers of thermosetting material. The use of "a first layer" and "a second layer" is not meant to limit the process or the 3D object to only two layers; the use of these phrases is to describe the process between two particular layers. In certain embodiments, the present disclosure can be directed to depositing of a layer and a subsequent layer. The 3D printing process can have many layers and the disclosure can be implemented in any of the layers during the 3D printing process.

In certain embodiments, the process comprises depositing an at least third layer of thermosetting material, wherein the beads of thermosetting material in the at least third layer are offset from the beads of thermosetting material in the second layer. In certain embodiment, the process comprises a plurality of layers of thermosetting material.

Applicant has surprisingly discovered that by factoring in the extent of cure of the thermosetting material and selecting a time per layer before depositing subsequent layers of thermosetting material, it is possible to 3D print objects having a high degree of overhang.

In certain embodiments, a time per layer can be adjusted to optimize the time between layers deposited by the extrusion nozzle. Depending on the properties of the reactive components and the geometry of the desired final 3D object, the time per layer can vary. As used herein, the term "time per layer" means the minimum amount of time which should elapse between depositing a layer of thermosetting material and depositing a subsequent layer of thermosetting material on the previous layer of thermosetting material. The minimum time per layer is generally longer when the overhang angle is larger (i.e., the more horizontal the angle) or when the cure rate is slower. In other words, the larger degree of overhang, the more cured and stable the previous layers should be before a new layer is deposited. It is possible to achieve large degrees of overhang by controlling the time per layer.

In certain embodiments, the time per layer of the thermosetting material can be from about 10 seconds to several hours. In certain embodiments, the time per layer of the thermosetting material can be from about 1 second to about 30 minutes. In certain embodiments, the time per layer of the thermosetting material can be from about 10 seconds to about 10 minutes. In certain embodiments, the time per layer of the thermosetting material can be from about 20 seconds to about 5 minutes. In certain embodiments, the time per layer of the thermosetting material can be from about 30 seconds to about 3 minutes. In certain embodiments, the time per layer of the thermosetting material can be from about 30 seconds to about 2 minutes. In certain embodiments, the time per layer of the thermosetting material can be from about 30 seconds to about 60 seconds.

In certain embodiments, the time per layer of the thermosetting material can be about 1 second, about 5 seconds, about 10 seconds, about 20 seconds, about 30 seconds, about 40 seconds, about 50 seconds, about 60 seconds, about 70 seconds, about 80 seconds, about 90 seconds, about 100 seconds, about 110 seconds, about 120 seconds, about 130 seconds, about 140 seconds, about 150 seconds, about 160 seconds, about 170 seconds, about 180 seconds, about 190 seconds, about 200 seconds, about 210 seconds, about 220 seconds, about 230 seconds, about 4 minutes, about 5 minutes, about 6 minutes, about 7 minutes, about 8 minutes, about 9 minutes, about 10 minutes, about 15 minutes, about 20 minutes, about 25 minutes, about 30 minutes, about 35 minutes, about 40 minutes, 50 minutes, 1 hour, 1.5 hours, 2 hours, or any ranges between the specified values.

In certain embodiments, the minimum residence time or maximum flow rate through the mixer can be adjusted to optimize the amount of overhang. The minimum residence time is the minimum time that the thermosetting material remains in the mixing chamber before it is deposited through the extrusion nozzle. The maximum flow rate through the mixer corresponds to viscosity and cure amount of the thermosetting material. Both the minimum residence time and maximum flow rate through the mixer factor in the cure rate of the thermosetting material. A longer residence time gives more time for the thermosetting material to cure. A larger flow rate through the mixer represents a more cured thermosetting material.

In certain embodiments, the minimum residence time can be from about 1 second to about 5 minutes; from about 5 seconds to about 4 minutes; from about 10 seconds to about 3 minutes; from about 15 seconds to about 2 minutes; and from 20 seconds to about 1 minute.

In certain embodiments, the minimum residence time can be about 1 second, about 5 seconds, about 10 seconds, about 15 seconds, about 20 seconds, about 25 seconds, about 30 seconds, about 35 seconds, about 40 seconds, about 45 seconds, about 50 seconds, about 55 seconds, about 1 minute, about 1.25 minutes, about 1.5 minutes, about 1.75 minutes, about 2 minutes, about 2.25 minutes, about 2.5 minutes, about 2.75 minutes, about 3 minutes, about 3.5 minutes, about 4 minutes, about 4.5 minutes, about 5 minutes, or any ranges between the specified values.

In certain embodiments, the maximum flow rate (also known as volumetric flow rate or extrusion rate) can be from about 0.01 g/min to about 50.0 g/min, from about 0.05 g/min to about 25 g/min; from about 0.1 g/min to about 20 g/min; from about 0.1 g/min to about 10 g/min; from about 0.12 g/min to about 5 g/min; from about 0.15 g/min to about 2.5 g/min; from about 0.2 g/min to about 1.0 g/m; and from about 0.25 g/min to about 0.5 g/min.

In certain embodiments, the maximum flow rate can be about 0.01 g/min, about 0.05 g/min, about 0.075 g/min, about 0.1 g/min, about 0.12 g/min, about 0.14 g/min, about 0.16 g/min, about 0.18 g/min, about 0.2 g/min, about 0.4 g/min, about 0.6 g/min, about 0.8 g/min, about 1.0 g/min, about 1.2 g/min, about 1.4 g/min, about 1.6 g/min, about 1.8 g/min, about 2.0 g/min, about 2.5 g/min, about 3.0 g/min, about 4.0 g/min, about 5.0 g/min, about 10.0 g/min, about 15.0 g/min, about 20.0 g/min, about 25.0 g/min, about 30.0 g/min, about 40.0 g/min, about 50.0 g/min, or any ranges between the specified values.

In certain embodiments, the maximum volumetric flow rate per distance traveled by the tip can be adjusted to optimize the amount of overhang. In certain embodiments, thicker lines can be deposited to sustain larger degrees of horizontal overhang. In certain embodiments, thicker lines can also provide sufficient overlap with the layer below to sustain an overhang.

In certain embodiments, the maximum volumetric flow rate per distance traveled by the tip can be from about 0.0001 g/mm to about 0.01 g/mm; from about 0.00025 g/mm to about 0.005 g/mm; from about 0.0005 g/mm to about 0.0025; and from 0.00075 g/mm to about 0.001 g/mm.

In certain embodiments, the maximum volumetric flow rate per distance traveled by the tip can be about 0.0001 g/mm, about 0.00025 g/mm, about 0.0005 g/mm, about 0.00075 g/mm, about 0.001 g/mm, about 0.002 g/mm, about 0.0025 g/mm, about 0.003 g/mm, about 0.0035 g/mm, about 0.004 g/mm, 0.0045 g/mm, about 0.005 g/mm, about 0.0075 g/mm, 0.01 g/mm, or any ranges between the specified values.

In certain embodiments, the method comprises applying a minimum time per layer, a minimum residence time or maximum flow rate through the mixer, and/or a minimum volumetric flow rate per distance traveled by the printer tip. In certain embodiments, the method comprises applying a minimum time per layer, a minimum residence time or maximum flow rate through the mixer, and a minimum volumetric flow rate per distance traveled by the printer tip. In certain embodiments, these parameters are adjusted for each layer of thermosetting material. For example, when there is an inward overhang, the 3D printing process slows down because the time per layer is shorter.

In certain embodiments, the depositing comprises depositing a first layer of thermosetting material and depositing an at least second layer of thermosetting material, wherein the beads of thermosetting material in the at least second layer are offset from the beads of thermosetting material in the first layer.

In certain embodiments, the beads of thermosetting material in the at least second layer can be about 5% offset from the beads of thermosetting material in the first layer. In certain embodiments, the beads of thermosetting material in the at least second layer can be about 10% offset from the beads of thermosetting material in the first layer. In certain embodiments, the beads of thermosetting material in the at least second layer can be about 20% offset from the beads of thermosetting material in the first layer. In certain embodiments, the beads of thermosetting material in the at least second layer can be about 30% offset from the beads of thermosetting material in the first layer. In certain embodiments, the beads of thermosetting material in the at least second layer can be about 40% offset from the beads of thermosetting material in the first layer. In certain embodiments, the beads of thermosetting material in the at least second layer can be about 50% offset from the beads of thermosetting material in the first layer.

In certain embodiments, the beads of thermosetting material in the at least second layer can be about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 10%, about 15%, about 20%, about 25%, about 30% about 35%, about 40%, about 45%, about 50%, about 55%, about 60%, about 65%, about 75%, or any ranges between the specified values offset from the beads of thermosetting material in the first layer.

Based on the desired geometry of the final 3D object, the overhang can be present in a portion of the 3D object and/or can be present throughout the entire 3D object. The 3D printing process can utilize the offset printing process as needed during the 3D printing process to yield the desired geometry.

In certain embodiments, each layer of the plurality of layers can be offset from the previously deposited layer. In certain embodiments, a majority of the layers of the plurality of layers can be offset from their previously deposited layers. In certain embodiments, less than a majority of the layers of the plurality of layers can be offset from their previously deposited layers.

In certain embodiments, the amount of offset in the beads of the first layer and the second layer can be the same as the amount of offset in the beads of the second layer and the third layer. In certain embodiments, the amount of offset in the beads of the first layer and the second layer can be different than the amount of offset in the beads of the second layer and the third layer. In certain embodiments, the amount of offset in the beads can be the same for the plurality of layers. In certain embodiments, the amount of offset in the beads can be different for the plurality of layers.

In certain embodiments, a 3D printed part produced in accordance with embodiments of the disclosure can have an overhang of about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 25 degrees, about 20 degrees, about 15 degrees, about 10 degrees, about 5 degrees, about 0 degrees, or any ranges between the specified values (where 0 degrees is a vertical wall and 90 degrees is a suspended horizontal bridge). In certain embodiments, a 3D printed part produced in accordance with embodiments of the disclosure can have several areas of overhang within a single 3D printed object (with each area containing an overhang degrees listed in this paragraph). As a nonlimiting example, a portion of a 3D printed object can have a first area with an overhang of 20 degrees, a second area with an overhang of 40 degrees, a third area with an overhang of 25 degrees, and a fourth area with an overhang of 85 degrees. There is no limit to the number of areas of overhang within a 3D printed object prepared by the processes of this disclosure.

As a nonlimiting example, the second layer can be about 10% offset from the first layer and the third layer can be about 10% offset from the second layer. As a nonlimiting example, the second layer can be about 5% offset from the first layer and the third layer can be about 10% offset from the second layer. As a nonlimiting example, the second layer can be about 10% offset from the first layer and the third layer can be about 5% offset from the second layer.

As a nonlimiting example, the second layer can be about 10% offset from the first layer, the third layer can be about 10% offset from the second layer, the fourth layer can be 0% offset from the third layer, the fifth layer can be 0% offset from the fourth layer, and the sixth layer can be 50% offset from the fifth layer.

In certain embodiments, the process comprises use of a support. As used herein, the term "support" means an object or material that can provide stability during 3D printing.

In certain embodiments, the process comprises depositing a support material during the depositing of the thermosetting material. In certain embodiments, the support material can be an olefinic material. In certain embodiments, the olefinic material can be a polyalkylene, such as polyethylene and/or polypropylene.

In certain embodiments, the support can be polypropylene. In certain embodiments, the support can be polylactic acid. In certain embodiments, the support can be acrylonitrile butadiene styrene (ABS). In certain embodiments, the support can be an ABS-like UV-curing rapid resin, such as Elegoo Standard resin. In certain embodiments, the support can be a silicone mat.

In certain embodiments, the support can be a two-component silicone, which can be manually or automatically applied onto the 3D printed object. In certain embodiments, the support can be a UV hardening silicone. In certain embodiments, the support can be an anti-adhesion agent, which can either remain in the 3D printed part or can be removed after printing. In certain embodiments, the support can be a paraffin wax. In certain embodiments, the anti-adhesion agent can be: two component silicones, wax paper, UV/light hardening silicones, waxes, paraffin waxes, resins that do not carry protic functional groups (e.g., including low/high density polyethylene, polypropylene, polystyrene), resins that have protic functional groups end capped (e.g., including acetate capped polyoxymethylene), mold release spray, water spray, saran wrap, paper or plastic foils, resins that decompose readily, and resins that are water-soluble.

In certain embodiments, the support material does not have strong adhesion to the reacting urethane mixture. In certain embodiments, the support material can be polyolefins, silicones, water-soluble PVA, and waxes. In certain embodiments, the method comprises applying a surface agent, such as a mold release agent, to a support, such as PLA.

When using a support it can be possible to take advantage of using lower viscosity/lower reactive urethanes to apply the urethanes to fill in the gaps and detail of a support material (as in Example 4). It is possible to use high flow rates (low residence times) in the mixer, fill crevices in a support, such as filling a mold, and then slow down for a more structural 3D print. This method allows for high resolution 3D parts.

The type of support can be selected on the basis of the printed detail that can be achieved with the support, but also on the basis of its removal method. For hard plastics, or where mold release is employed, it is possible to remove the urethane from the support, and then re-use the support for the next print. Wax can be melted away. For PVA, the part can be placed in a hot water bath for the PVA to dissolve, leaving the urethane behind.

In certain embodiments, the support can be coated. In certain embodiments, the support can be coated with a release agent, such as a mold release agent. In certain embodiments, the support can be coated with a paste wax, such as a finish paste wax. In certain embodiments, the support is untreated.

In certain embodiments, the support can be 3D printed with a fused filament fabrication (FFF) printer. In certain embodiments, the support can be 3D printed with a stereolithography (SLA) printer. In certain embodiments, the support can be co-3D printed with the depositing of the 3D object having overhang. In certain embodiments, the support can be 3D printed prior to depositing the 3D object having overhang.

In certain embodiments, the process comprises removing the support. In certain embodiments, the removing can be by melting. In certain embodiments, the support is not removed and can remain within the object.

In certain embodiments, the 3D object can have any amount of overhang. In certain embodiments, the overhang can be on only a portion of the 3D object. In certain embodiments, the overhang can be on the entire 3D object.

In certain embodiments, a portion of the 3D object comprises an overhang of at least about 10 degrees. In certain embodiments, a portion of the 3D object comprises an overhang of at least about 20 degrees. In certain embodiments, a portion of the 3D object comprises an overhang of at least about 30 degrees. In certain embodiments, a portion of the 3D object comprises an overhang of at least about 40 degrees. In certain embodiments, a portion of the 3D object comprises an overhang of at least about 50 degrees. In certain embodiments, a portion of the 3D object comprises an overhang of at least about 60 degrees. In certain embodiments, a portion of the 3D object comprises an overhang of at least about 70 degrees. In certain embodiments, a portion of the 3D object comprises an overhang of at least about 80 degrees.

In certain embodiments, the process can comprise use of any number of reactive components. In certain embodiments, the process can comprise use of a first reactive component and a second reactive component. In certain embodiments, the process can comprise at least a third reactive component. In certain embodiments, the process can comprise at least a fourth reactive component. In certain embodiments, the process can comprise at least a fifth reactive component.

In certain embodiments, the present disclosure is directed to a 3D object produced by the disclosed methods.

Thermosetting Material

The thermosetting material according to embodiments of the disclosure can be composed of any number of materials.

In certain embodiments, the thermosetting material can be an isocyanate, an isocyanate prepolymer, a urethane, a urea-containing polymer, a polyol prepolymer, an amine prepolymer, a polyol containing at least one terminal hydroxyl group, a polyamine containing at least one amine that contains an isocyanate reactive hydrogen, or mixtures thereof.

In certain embodiments, the thermosetting material can be an isocyanate. In certain embodiments, the thermosetting material can be an isocyanate prepolymer. In certain embodiments, the thermosetting material can be a urethane. In certain embodiments, the thermosetting material can be a urea-containing polymer. In certain embodiments, the thermosetting material can be a polyol prepolymer. In certain embodiments, the thermosetting material can be an amine prepolymer. In certain embodiments, the thermosetting material can be a polyol containing at least one terminal hydroxyl group. In certain embodiments, the thermosetting material can be a polyamine containing at least one amine that contains an isocyanate reactive hydrogen.

In certain embodiments, the thermosetting material can be a urethane and/or urea-containing polymer. In certain embodiments, a urethane and/or urea-containing polymer can be a polymer which contains urethane groups (—NH—(C═O)—O—) as part of the polymer chain. The urethane linkage can be formed by reacting isocyanate groups (—N═C═O) with hydroxyl groups (—OH). A polyurethane can be produced by the reaction of an isocyanate containing at least two isocyanate groups per molecule with a compound having terminal hydroxyl groups. In certain embodiments, an isocyanate having, on average, two isocyanate groups per molecule can be reacted with a compound having, on average, at least two terminal hydroxyl groups per molecule.

In certain embodiments, a urethane and/or urea-containing polymer can be a polymer which contains urea groups (—NH—(C═O)—NH—) as part of the polymer chain. A urea linkage can be formed by reacting isocyanate groups (—N═C═O) with amine groups (e.g., —N(R')$_2$), where each R' is independently hydrogen or an aliphatic and/or cyclic group (typically a (C$_1$-C$_4$)alkyl group)). A polyurea can be produced by the reaction of an isocyanate containing at least two isocyanate groups per molecule with a compound having terminal amine groups.

In certain embodiments, an aliphatic group can be a saturated or unsaturated linear or branched hydrocarbon group. This term can encompass alkyl (e.g., —CH$_3$) (or alkylene if within a chain such as —CH$_2$—), alkenyl (or alkenylene if within a chain), and alkynyl (or alkynylene if within a chain) groups, for example. In certain embodiments an alkyl group can be a saturated linear or branched hydrocarbon group including, for example, methyl, ethyl, isopropyl, t-butyl, heptyl, dodecyl, octadecyl, amyl, 2-ethylhexyl, and the like. In certain embodiments, an alkenyl group can be an unsaturated, linear or branched hydrocarbon group with one or more carbon-carbon double bonds, such as a vinyl group. In certain embodiments, an alkynyl group can be an unsaturated, linear or branched hydrocarbon group with one or more carbon-carbon triple bonds. Unless otherwise indicated, an aliphatic group typically contains from 1 to 30 carbon atoms. In certain embodiments, the aliphatic group can contain 1 to 20 carbon atoms, 1 to 10 carbon atoms, 1 to 6 carbon atoms, 1 to 4 carbon atoms, or 1 to 3 carbon atoms.

In certain embodiments, a cyclic group can be a closed ring hydrocarbon group that is classified as an alicyclic group, aromatic group, or heterocyclic group, and can optionally include an aliphatic group. In certain embodiments, an alicyclic group can be a cyclic hydrocarbon group having properties resembling those of aliphatic groups. In certain embodiments, an aromatic group or aryl group can be a mono- or polynuclear aromatic hydrocarbon group. In certain embodiments, a heterocyclic group can be a closed ring hydrocarbon in which one or more of the atoms in the ring is an element other than carbon (e.g., nitrogen, oxygen, sulfur, etc.). Unless otherwise specified, a cyclic group can have 6 to 20 carbon atoms, 6 to 18 carbon atoms, 6 to 16 carbon atoms, 6 to 12 carbon atoms, or 6 to 10 carbon atoms.

In certain embodiments, a urethane and/or urea-containing polymer can be a polymer that contains both urethane and urea groups as part of the polymer chain. A polyurethane/polyurea can be produced by the reaction of an isocyanate containing at least two isocyanate groups per molecule with a compound having terminal hydroxyl groups and a compound having terminal amine groups. In certain embodiments, a polyurethane/polyurea can be produced by the reaction of an isocyanate containing at least two isocyanate groups per molecule with a compound having terminal hydroxyl groups and terminal amine groups (e.g., a hydroxyl-amine such as 3-hydroxy-n-butylamine (CAS 114963-62-1)). A reaction to make a polyurethane, a polyurea, or a polyurethane/polyurea can include other additives, including but not limited to, a catalyst, a chain extender, a curing agent, a surfactant, a pigment, or a combination thereof.

An isocyanate, which can be considered a polyisocyanate, can have the structure R—(N═C═O)$_n$, where n can be at least 2, at least 3, at least 4, at least 5, at least 6, at least 7, or at least 8, and where R can be an aliphatic and/or cyclic group. In certain embodiments, an isocyanate can have an n that is equivalent to n in methylene diphenyl diisocyanate (MDI). In certain embodiments, the isocyanate can be a di-isocyanate (e.g., R—(N═C═O)$_2$ or (O═C═N)—R—(N═C═O)).

In certain embodiments of the 3D object production the thermosetting material can comprise an isocyanate content on an A side of from about 2% to about 20%, from about 5% to about 15%, or from about 6% to about 13%.

In certain embodiments of the 3D object production the thermosetting material can comprise a viscosity on an A side of from about 1000 cps to about 10,000 cps at 25° C.; from about 5000 cps to about 80,000 cps at 25° C.; from about 1000 cps at 25° C. to about 120,000 cps at 80° C.; or from about from about 5000 cps at 25° C. to about 100,000 cps at 80° C. In certain embodiments of the 3D object production the thermosetting material can comprise a viscosity on a B side of from about 1000 cps to about 10,000 cps at 25° C.; from about 5000 cps to about 80,000 cps at 25° C.; from about 1000 cps at 25° C. to about 120,000 cps at 80° C.; or from about 5000 cps at 25° C. to about 100,000 cps at 80° C.

In certain embodiments of the 3D object production the thermosetting material can comprise an amine content on a B side of from about 3% to about 15%. In certain embodiments of the 3D object production the thermosetting material can comprise an amine content on a B side of from about 4% to about 13%.

Examples of isocyanates can include, but are not limited to, methylene diphenyl diisocyanate (MDI) and toluene diisocyanate (TDI). Examples of MDI can include, but are not limited to, monomeric MDI, polymeric MDI, and isomers thereof. Examples of isomers of MDI having the chemical formula $C_{15}H_{10}N_2O_2$ can include, but are not limited to, 2,2'-MDI, 2,4'-MDI, and 4,4'-MDI. Examples of isomers of TDI having the chemical formula $C_9H_6N_2O_2$ can include, but are not limited to, 2,4-TDI and 2,6-TDI. In certain embodiments, examples of isocyanates can include, but are not limited to, monomeric diisocyanates and blocked polyisocyanates. In certain embodiments, examples of monomeric diisocyanates can include, but are not limited to, hexamethylene diisocyanate (HDI), methylene dicyclohexyl diisocyanate or hydrogenated MDI (HMDI), and isophorone diisocyanate (IPDI). In certain embodiments, an example of an HDI can be hexamethylene-1,6-diisocyanate. In certain embodiments, an example of an HMDI can be dicyclohexylmethane-4,4'-diisocyanate. Blocked polyisocyanates can be based on HDI or IDPI. In certain embodiments, examples of blocked polyisocyanates can include, but are not limited to, HDI trimer, HDI biuret, HDI uretidione, and IPDI trimer.

In certain embodiments, examples of isocyanates can include, but are not limited to, aromatic diisocyanates, such as a mixture of 2,4- and 2,6-tolylene diisocyanates (TDI), diphenylmethane-4,4'-diisocyanate (MDI), naphthalene-1,5-diisocyanate (NDI), 3,3'-dimethyl-4,4'-biphenylene diisocyanate (TODI), crude TDI, polymethylenepolyphenyl isocyanurate, crude MDI, xylylene diisocyanate (XDI), and phenylene diisocyanate; aliphatic diisocyanates, such as 4,4'-methylene-biscyclohexyl diisocyanate (hydrogenated MDI), hexamethylene diisocyanate (HMDI), isophorone diisocyanate (IPDI), and cyclohexane diisocyanate (hydrogenated XDI); and modified products thereof, such as isocyanurates, carbodiimides and allophanamides.

In certain embodiments, a compound having terminal hydroxyl groups $(R-(OH)_n)$, where n is at least 2 (referred to herein as "di-functional"), at least 3 (referred to herein as "tri-functional"), at least 4, at least 5, at least 6, at least 7, at least 8, at least 9, and 10, where R is an aliphatic and/or cyclic group, can be a "polyol." In certain embodiments a polyol mixture can include a small amount of mono-functional compounds having a single terminal hydroxyl group.

In certain embodiments, examples of polyols can include, but are not limited to, polyester polyols and polyether polyols. In certain embodiments, examples of polyester polyols can include, but are not limited to, those built from condensation of acids and alcohols. In certain embodiments, examples can include those built from phthalic anhydride and diethylene glycol, phthalic anhydride and dipropylene glycol, adipic acid and butanediol, and succinic acid and butane or hexanediol. In certain embodiments, polyester polyols can be semi-crystalline. In certain embodiments, examples of polyether polyols can include, but are not limited to, those built from polymerization of an oxide such as ethylene oxide, propylene oxide, or butylene oxide from an initiator such as glycerol, dipropylene glycol, TPG (tripropylene glycol), castor oil, sucrose, or sorbitol.

In certain embodiments, examples of polyols can include, but are not limited to, polycarbonate polyols and lactone polyols such as polycaprolactone. In certain embodiments, a compound having terminal hydroxyl groups $(R-(OH)_n)$ can have a molecular weight (calculated before incorporation of the compound having terminal hydroxyl groups into a polymer) of from about 200 Daltons to about 20,000 Daltons, such as from about 200 Daltons to about 10,000 Daltons.

In certain embodiments, a compound having terminal amine groups (e.g., $R-(N(R')_2)_n$), where n can be at least 2, at least 3, at least 4, at least 5, at least 6, at least 7, at least 8, at least 9, and 10, where R can be an aliphatic and/or cyclic group, and where each R' can be independently hydrogen or an aliphatic and/or cyclic group (e.g., a ($C_1$-$C_4$)alkyl group), can be referred to as a "polyamine." In certain embodiments, a polyamine mixture can include a small amount of mono-functional compounds having a single terminal amine group.

In certain embodiments, a suitable polyamine can be a diamine or triamine, and can be either a primary or secondary amine. In certain embodiments, a compound having terminal amine groups can have a molecular weight (calculated before incorporation of the compound having terminal hydroxyl groups into a polymer) of from about 30 Daltons to about 5000 Daltons, such as from about 40 Daltons to about 400 Daltons.

In certain embodiments, examples of polyamines can include, but are not limited to, diethyltoluene diamine, di-(methylthio)toluene diamine, 4,4'-methylenebis(2-chloroaniline), and chain extenders available under the trade names LONZACURE L15, LONZACURE M-CDEA, LONZACURE M-DEA, LONZACURE M-DIPA, LONZACURE M-MIPA, and LONZACURE DETDA.

In certain embodiments, examples of suitable polyamines can include, but are not limited to, ethylene diamine, 1,2-diaminopropane, 1,4-diaminobutane, 1,3-diaminopentane, 1,6-diaminohexane, 2,5-diamino-2,5-dimethylhexane, 2,2, 4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4' and/or 4,4'-diaminodicyclohexyl methane, and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,4' and/or 4,4'-diaminodiphenyl methane; and polyoxyalkylene polyamines.

In certain embodiments, the term polyol and/or polyamine mixture can be a mixture of one or more polyols of varied molecular weights and functionalities, one or more polyamines of varied molecular weights and functionalities, or a combination of one or more polyols and one or more polyamines.

In certain embodiments, the present disclosure also provides the compositions described herein and a thermoset system comprising the compositions, e.g., a first reactive component and a second reactive component, and one or more optional reactive components, such as a third reactive component.

In certain embodiments, the thermosetting material can comprise at least one reactive component. In certain embodiments, the thermosetting material can comprise at least two reactive components. In certain embodiments, the thermosetting material can comprise at least three reactive components. In certain embodiments, the thermosetting material can comprise at least four reactive components.

In certain embodiments, the thermosetting material can be prepared by methods disclosed in WO 2018/106822 and PCT/US2018/064323, each of which is incorporated in its entirety herein. In certain embodiments, a method for making a thermosetting material, such as a urethane and/or urea-containing polymer thermoset product, can include introducing first and second reactive components into a mixing chamber. In certain embodiments, the first reactive component can include an isocyanate and the second reactive component can include a polyol and/or polyamine mixture. In certain embodiments, the first reactive component can include an isocyanate and the second reactive component can include a polyol. In certain embodiments, the first reactive component can include an isocyanate and the second reactive component can include a polyamine. In certain embodiments, the first reactive component can include an isocyanate and the second reactive component can include a polyol and a polyamine. The first and second reactive components can have certain characteristics including, but not limited to, viscosity, reactivity, and chemical compatibility.

In certain embodiments, the thermosetting material can be a solid thermosetting material.

In certain embodiments, the thermosetting material can be a foam thermosetting material.

In certain embodiments, the thermosetting material can be a solid thermosetting material and a foam thermosetting material.

While the following description is in the context of foams, the description can apply to thermosetting materials, including urethane and/or urea-containing polymers in general, both non-foam and foam. Foams are available in a range of hardness and resiliencies. A urethane and/or urea-containing polymer can be very durable, permitting the foam to be used repeatedly without a change in properties. This range of properties permits these materials to be used in clinical settings where rigid positioning is desirable or where pressure distribution is more desirable.

Foams of urethane and/or urea-containing polymers can be the product of a reaction between two reactant components. A range of foam properties can be achieved by altering the relative weights of formulation components to balance reaction speed, interfacial tension of the reacting mixture, and elasticity of the polymeric scaffold. In 3D printing, an extrusion nozzle can deposit material, e.g., thermosetting material, on a substrate layer by layer, following a 3D computer model of the desired 3D object.

In certain embodiments, foam precursor formulas can enable high resolution 3D deposition to form a custom 3D foam object. In certain embodiments, by partially advancing the reaction of the precursors, such as polyurethane precursors, and adjusting catalyst and surfactant levels, it is possible to deposit the thermosetting material while maintaining the desired predetermined part resolution and mechanical integrity of the foam.

The production of a foam of urethane and/or urea-containing polymers can differ from the production of a non-foam urethane and/or urea-containing polymer by the inclusion of water. Foams of urethane and/or urea-containing polymer can be formed by the simultaneous reaction of isocyanates with water to form urea linkages and produce gas, and the reaction of isocyanates with multifunctional high molecular weight alcohols to form a crosslinked elastomeric foam scaffold.

In certain embodiments, foams can be formed by reacting monomers: a di-isocyanate, water, and multi-functional alcohol (e.g., a polyol) or a multi-functional amine. The quantity of water in the formula can affect the foam density and the strength of the foam scaffold. The molecular weight of the polyol and/or polyamine mixture can determine the crosslink density of the foam scaffold and the resulting elasticity, resiliency, and hardness of the foam. In certain embodiments, a nearly stoichiometric quantity of di-isocyanate can be used to fully react with the water and a polyol and/or polyamine mixture.

In certain embodiments, prepolymer synthesis can be used to alter the cure profile of a polyurethane or polyurea system. In prepolymer synthesis, a stoichiometric excess of di-isocyanate can be reacted with a polyol and/or polyamine mixture. The resulting prepolymer can have a higher molecular weight than the starting di-isocyanate, and molecules in the pre-polymer can have isocyanate functionality and therefore still be reactive. Because of the higher molecular weight, hydrogen bonding, and/or urea linkages, the prepolymer can also have a higher viscosity. This prepolymer can be subsequently reacted with a polyol and/or polyamine mixture and water to produce a foam with substantially the same foam scaffold composition that is achievable without prepolymer synthesis. However, viscosity growth profile can be altered, typically starting higher, and increasing more slowly, and therefore the morphological features of the foam, such as foam cell size and cell stability, can result in a foam with a very different appearance.

Support foams are not a single density, hardness, or resilience, but can span a wide range of performance. The present disclosure extends the entire range of foam properties. Foam density and hardness can be interrelated: low density foams can be softer foams. A range of foam density and hardness can be achieved first by varying the level of blowing agent, such as water, in the formulation and by adjusting the extent of excess isocyanate in the formula. Increasing the degree of functionality of the components of the polyol and/or polyamine mixture (e.g., incorporating some 4- or 6-functional polyols) can increase hardness and the viscosity growth rate during cure. Foam resilience can be altered by varying the polyols and/or polyamines incorporated in the formula. Memory foams can be achieved by reducing the molecular weight of the polyols and polyamines; high resiliency can be achieved by incorporating graft polyols. In certain embodiments, the foam density range can be less than 0.3 g/cm$^3$, ranging from 30-50 ILFD hardness, and resilience ranging from 10 to 50%. Foam properties can also include open cell content and closed cell content. Open cell foams can be cellular structures built from struts, with windows in the cell walls which can permit flow of air or liquid between cells. Closed cells can be advantageous for preventing air flow, such as in insulation applications.

Controller, Sensors, and Processors

In certain embodiments, the present disclosure includes a control system or a computing apparatus operably coupled to a printing apparatus.

The computing apparatus can be, for example, any fixed or mobile computer system (e.g., a controller, a microcontroller, a personal computer, minicomputer, etc.). The exact configuration of the computing apparatus is not limiting, and essentially any device capable of providing suitable computing capabilities and control capabilities can be used, a digital file can be any medium (e.g., volatile or non-volatile memory, a CD-ROM, magnetic recordable tape, etc.) containing digital bits (e.g., encoded in binary, etc.) that can be readable and/or writeable by computing apparatus. Also, a file in user-readable format can be any representation of data (e.g., ASCII text, binary numbers, hexadecimal numbers, decimal numbers, graphically, etc.) presentable on any medium (e.g., paper, a display, etc.) readable and/or understandable by an operator.

In certain embodiments, the control system can include one or more processors.

In certain embodiments, the system can the control system comprises one or more sensors. In certain embodiments, the one or more sensors can detect the location of the 3D printed object during the depositing.

In certain embodiments, the one or more sensors can detect the location of the 3D printed object during the depositing and optimize the depositing of the thermosetting material based on the shape and location of the 3D printed object.

In certain embodiments, the controller can comprise one or more processors and can provide instructions to the extruded thermoset printing apparatus. These instructions can modify the method for printing a 3D printed object. In certain embodiments, these instructions instruct at least one actuator operably coupled to the extrusion nozzle to move the extrusion nozzle when delivering thermosetting material to form the 3D printed object.

In certain embodiments, a controller can analyze aspect ratio and deposit thermosetting material based on the aspect ratio of a bead. For example, the controller can instruct the 3D printer to print with a low aspect ratio/high viscosity bead for certain aspects of a 3D printed object and then the controller can instruct the 3D printer to print with a high aspect ratio/low viscosity bead for other aspects of a 3D printed object. This controlling of aspect ratio can provide a 3D printed object with high resolution, e.g., on the edges of a 3D object, and then use increased printing speeds to space fill aspects of a 3D object.

In certain embodiments, the controller can adjust one or both of the amount and flow rate of the thermosetting material to provide a physical property of a first area that is different than the same physical property of the second area. In certain embodiments, the physical property can be one or more of flexibility, color, optical refractive index, hardness, porosity, and density.

In certain embodiments, the controller can be configured to execute or the method further comprises adjusting one or both of an amount and a flow rate of a gas-generation source for use with one or more of a first, second, and third reactive components.

In certain embodiments, the controller can be configured to execute or the method further comprises controlling a distance between the extrusion nozzle and the 3D printed object.

EXAMPLES

The methods, systems, and objects described herein are now further detailed with reference to the following examples. These examples are provided for the purpose of illustration only and the embodiments described herein should in no way be construed as being limited to these examples. Rather, the embodiments should be construed to encompass any and all variations which become evident as a result of the teaching provided herein.

Example 1: Printing of Part with Overhang

A part having a 75 degree overhang was printed.

The thermosetting material resin was a composition containing an isocyanate and a polyol. The isocyanate contained MDI prepolymer with 9% NCO, as measured by titration, 100,000 cps at room temperature, as measured by Brookfield viscometer, 31 spindle and 1.5 RPM. The polyol contained 3.3% E100, 9.6% E300, and 87.1% hydroxyl-terminated MDI-polyether urethane.

The isocyanate and polyol were extruded with Viscotec extruders through a Sulzer static mixer. ViscoTec liquid pumps feed the mixing chamber. The current drawn by the motors driving the ViscoTec liquid pump range is between 0.5 A and 1.25 A. The ViscoTec liquid pump can accurately pump liquids at a rate of between 0.05 ml/s and 6.0 ml/s. The ViscoTec extruder is capable of accurately metering the volume of reactive components extruded. A Sulzer Mixpac Statomix EA3.0-13SA 13 element static mixer was attached to a 1:1 dual cartridge which was controlled by the printer.

The printhead deposited material in an outward spiral with inner radius of 30 mm. The spiral shape was defined such that the beads were separated by 0.5 mm. The printhead moved at a speed of 1200 mm/min and an extrusion rate of 0.75 mm$^3$/mm. The tip height of the extruder was set so that it was 0.15 mm above the bead height. The bead width was 1.2 mm. With this printing speed, 9.4 seconds elapsed per rotation.

As the part printed in this manner, five sequential rotations yielded a ring with a 75 degree overhang.

Example 2 Printing of Urethane Thermosetting Material on Support Materials

Support materials were 3D printed and then a urethane thermosetting material was printed on the support material. Polypropylene, polylactic acid, and acrylonitrile butadiene styrene support materials were each printed using an Ultimaker FFF printer. Elegoo Standard resin was printed using a SLA printer.

PLA, ABS, and Elegoo were coated with 2831 Mold Release Agent or Turtle Wax Super Hard Shell Finish Paste Wax. Polypropylene was used untreated.

Urethane thermosetting material was printed with a German RepRap printer using dual viscotec pumps and a Sulzer static mixer onto the FFF printed part.

After 1 or 2 hours at room temperature, the urethane part could be peeled easily from the support material.

Example 3: Printing of Part with Inward Overhang

Figure 2:
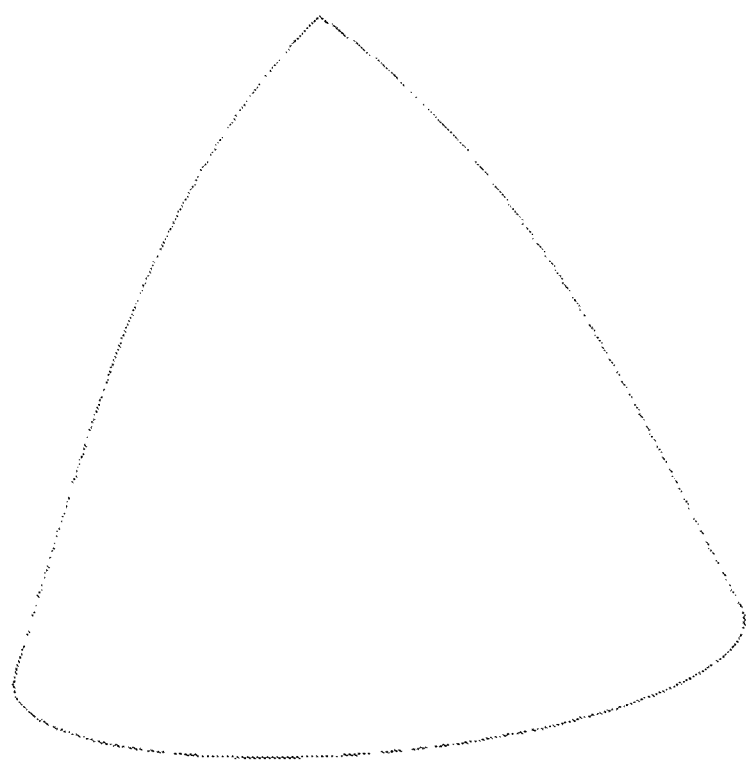
FIG. 2 depicts a part with an inward overhang.

Urethane thermosetting material specified as Resin A, was printed with a JuggerBot FH3-3D printer with a 2K Visco-Tec extruder and a Nordson 600 mL syringe retainer system with 75 psi air pressure on the cartridges. The static mixer is a Sulzer MKH 02-16S static mixer. A part was printed with an inward overhang. This part is completely unsupported and stands through the stability of the as-printed material only. This part is a thin cone around 3.1 mm thick with an organic curve to the side (instead of a more common straight surface) and is water-tight if flipped over and water is poured into it. FIG. 2 represents a CAD depiction of the part.

The part as printed is 114.3 mm tall and about 134.6 mm wide at its base. The flow rate of material from the nozzle varied from 1.44 g/min to 0.144 g/min during the print. The flow rate was changed over the course of the print to be slower as the time taken per layer decreased due to the decreasing circumference of the part by decreasing the linear speed and to prevent part buckling. A Duet 2 Ethernet controller was used in the printer and the following settings were used during the print: X and Y acceleration: 100 mm/sec$^2$, pressure advance was on the A-side only and was: 1.5 seconds. Prime and retract was not used. A 1:1 index was used in the mixing extruder. The linear speed varied from 300 mm/min to 30 mm/min. Layer height was 1.28 mm. A table with the values changed during the print is shown as Table 1. Z-height is the height that the part is printed at. The Z-height adjustment column describes a dynamic adjustment during the print that adjusted the actual height of the extruder up or down to compensate for height variations in the print. This was a cumulative effect.

TABLE 1

Z-Height, Feed Rate, and Z-Height Adjustment during Printing

| Layer # | Z-Height (mm) | Feed Rate (mm/min) | Z-Height Adjustment (mm) |
|---|---|---|---|
| 0 | 0.00 | 300 | |
| 4 | 5.12 | 270 | |
| 5 | 6.40 | 240 | Down 0.3 |
| 6 | 7.68 | 216 | |
| 11 | 14.08 | 195 | Down 0.10 |
| 20 | 25.60 | 180 | |
| 26 | 33.28 | 165 | Down 0.10 |
| 52 | 66.56 | 110 | |
| 55 | 70.40 | 110 | Down 0.50 |
| 56 | 71.68 | 120 | |
| 67 | 85.76 | 100 | Down 0.40 |
| 68 | 87.04 | 80 | |
| 69 | 88.32 | 80 | Down 0.30 |
| 75 | 96.00 | 80 | Down 0.30 |
| 79 | 101.12 | 72 | |
| 80 | 102.40 | 60 | Down 0.30 |
| 83 | 106.24 | 60 | Down 1.0 |
| 85 | 108.80 | 54 | |
| 86 | 110.08 | 54 | Down 0.40 |
| 88 | 112.64 | 54 | Down 0.80 |
| 89 | 113.92 | 48 | |
| 90 | 115.20 | 43.2 | |
| 91 | 116.48 | 36 | Down 1.0 |
| 92 | 119.04 | 30 | |

Example 4: Printing of Part Containing Support

A thermoset part was deposited onto polyvinyl alcohol (PVA) using a urethane thermosetting material specified as Resin B and an infill Resin E. This material was deposited with a 2K ViscoTec extruder and two 60 mL syringes with 75 psi air pressure on the seals of the syringes. The static mixer is a Sulzer MKH 02-16S static mixer. The PVA was then dissolved overnight in a water bath and rinsed. This left only the thermoset material.

Example 5: Printing of Ring-Shaped Part with Overhang

A ring-shaped part was printed with a 73 degree overhang using a thermosetting material resin specified as Resin C on a German RepRap printer with a ViscoTec extruder through a Sulzer MKH 02-16S static mixer. A 3D printed support was used to achieve the specified overhang at the base of the part. The support material was polylactic acid and printed using an Ultimaker printer. The PLA support material was coated with 2831 Mold Release Agent at least 10 to 15 minutes before printing on the support. The base of the part having the 73 degree overhang was printed using a linear infill with a layer height of 0.75 mm for 5 layers. The perimeter bead was printed with an extrusion rate of 1.7 mm$^3$/mm and the infill had an extrusion rate of 1.0 mm$^3$/mm. The printhead moved at a speed of 1200 mm/min with a bead width of 0.8 mm.

Figure 3:
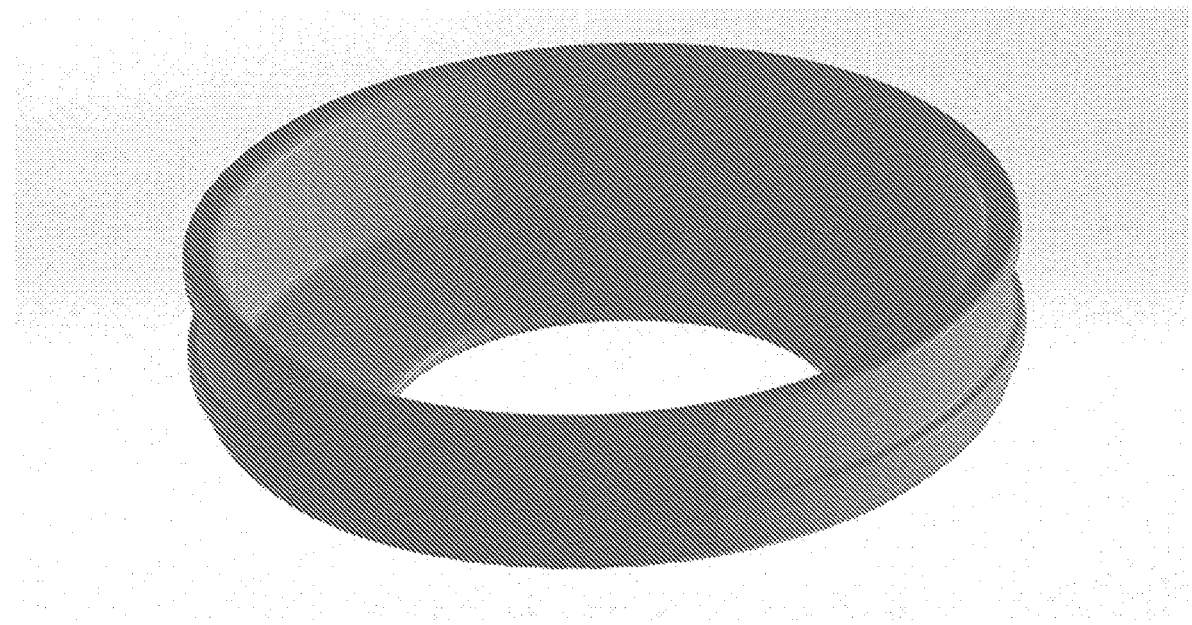
FIG. 3 depicts a ring-shaped part with overhang.

The vertical walls of the part were printed with no overhang, except for layers 11-12 and 19-20, where two extended lips were printed with a 0.8% offset to the layers in between these layers. This resulted in a slight overhang without the use of support material, as shown in FIG. 3.

Print parameters used for the walls were a bead spacing of 1.9 mm and extrusion rate of 2.8 mm$^3$/mm with a printhead speed of 500 mm/min. A slower speed was used so the time per layer was not too low and ensured sufficient cure time for each bead to be laid on of each other. Pressure advance was enabled from layer 11 onwards at a value of 0.75 seconds. After 1-2 hours at room temperature, the print was removed from the support material.

Example 6a: Printing an Unsupported Overhang with Urethane Thermosetting Materials Stl files describing five inverted truncated cones were produced in solidworks. For each of the stl files, the diameter of the base of the inverted truncated cone was 49.5 mm. The slant angle of the truncated cones were 65, 55, 45, 35, and 25 degrees (90 degrees is horizontal, 0 degrees is vertical). Each stl file was sliced in Simplify 3D to produce gcode instructions for printing. For each file the settings were: Extrusion width: 0.8 mm; Single outline corkscrew printing mode (vase mode): enabled; Linear speed: 300 mm/min.

The gcode was further processed in Chromaware to set the extrusion rate. The extrusion rates for each part are given in Table 2.

The printer uses a Duet 2 Ethernet controller with the following settings: X and Y acceleration: 10 mm/sec$^2$; Pressure Advance: 0.75 seconds; mm of filament to prime: 2 mm; mm of filament to retract: 12 mm; Mixing ratio: 1.1 A side:1 B side. The parts were printed using the Resin C resin.

The gcode file was not printed until completion. Rather, it was terminated once material began curing inside the static mixer and clogged the printer tip due to the extended residence time. A clog in the printer tip was detected by visual inspection. When clogged, the material extruded could not fill the space between the previous layer and the printer tip, and the static mixer became opaque. The layer height and volumetric flow rate varied between prints (Table 2).

TABLE 2

Layer Height and Volumetric Flow Rate for Five Different Parts

| Slant Angle (degrees) | Layer Height (mm) | Extrusion rate (g/min) | Height of inverted cone (mm) |
|---|---|---|---|
| 65 | 0.3 | 0.180 | 6 |
| 55 | 0.3 | 0.171 | 10 |
| 45 | 0.3 | 0.126 | 10 |
| 35 | 0.4 | 0.117 | 10 |
| 25 | 0.5 | 0.144 | 10 |

Example 6b: Printing an Unsupported Overhang with Urethane Thermosetting Materials The gcode for the 65 and 45 degree inverted cones from Example 6a were reprocessed in Chromaware to alter the extrusion rate. The extrusion rates for each part are given in Table 3.

The printer uses a Duet 2 Ethernet controller with the following settings: X and Y acceleration: 10 mm/sec$^2$; Pressure Advance: 0.75 seconds; mm of filament to prime: 2 mm; mm of filament to retract: 12 mm; Mixing ratio: 1.1 A side:1 B side The parts were printed with Resin F. The gcode file was not printed until completion. Rather, it was terminated once material began curing inside the static mixer. The layer height and volumetric flow rate varied between prints (Table 3).

TABLE 3

Layer Height and Volumetric Flow Rate for Four Different Parts

| Slant Angle (degrees) | Resin | Extrusion rate (g/min) | Height of inverted cone (mm) |
|---|---|---|---|
| 65 | Resin C | 0.180 | 6 |
| 65 | Resin F | 0.171 | 6 |
| 45 | Resin C | 0.126 | 10 |
| 45 | Resin F | 0.162 | 14 |

As shown in Example 6b and Table 3, a more reactive resin (Resin F is more reactive than Resin C) was able to achieve higher overhang distances at similar settings. Resin F was able to achieve a larger height of inverted cone at the same overhang of 45° using a similar extrusion rate/volumetric flow rate when compared to the Resin C sample. These resins had a higher degree of cure at the same residence time, and also a higher degree of cure after an elapsed time per layer. Therefore the printing parameters used to print an overhang are related to the reactivity of the printing resin.

Example 7a: Printing of Urethane Thermosetting Material with Internal Support Urethane thermosetting material was printed with a German RepRap printer using dual viscotec pumps and a Sulzer static mixer.

Figure 4:
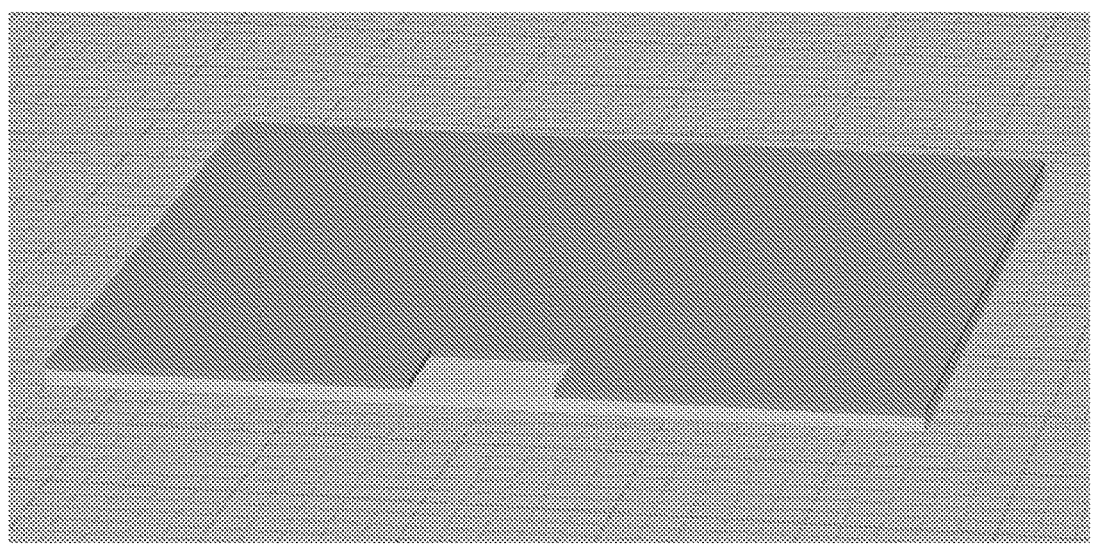
FIG. 4 depicts a base layer and a top layer.
Figure 5:
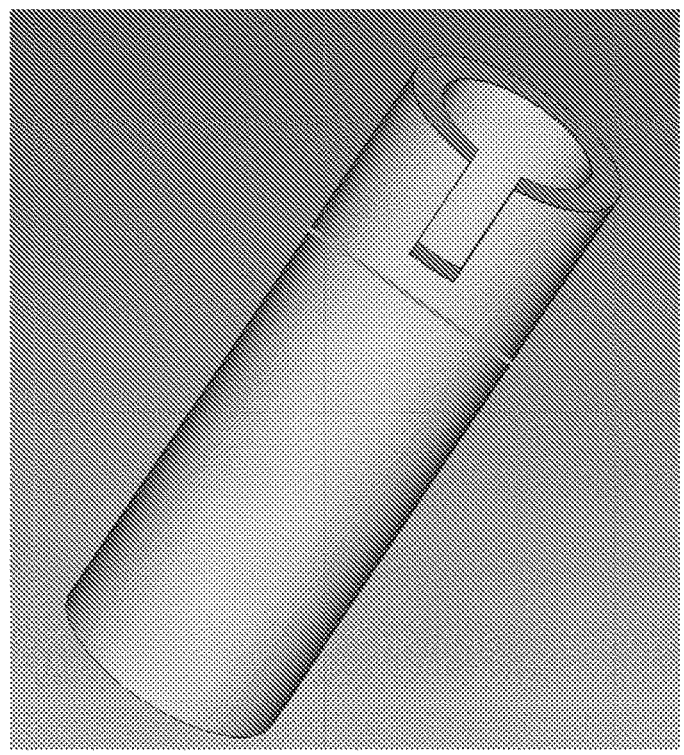
FIG. 5 depicts a polyurethane tube with a pocket that was cut away.

A base layer was printed with Resin A. FIG. 4 shows the base layer (lighter color) and a top layer (darker color) that was added later. An 80×80×2.2 mm square was printed. The printhead moved at a speed of 1200 mm/min and extruded at 0.91 mm$^3$/mm. Bead spacing was set to 0.8 mm and a layer height of 1.1 mm. Two layers were printed. A commercially available PU tubing was structured with sandpaper and a pocket was cut out of the commercial tube with pliers (FIG. 5).

While the printed base layer was still fresh and malleable, the PU tube was added by carefully pressing it onto the base layer at the area where the pocket of the top layer was added later. The cut away section was facing towards the base layer when pressing it onto it, while making sure that also the intact circular section of the tube is pressed into the base layer. The base layer print with the attached tubing was put into the curing oven for 1 h at 60° C.

The used 2 component silicone material (EROSIL-10) that was applied had the following specifications: Hardness after crosslinking: 10 (+/−2) ShA°; Mixing viscosity at the start of catalysis: 4000 (+/−1000) cps; Density: 1.07 g/cm$^3$; Tensile strength: 2.5 Mpa; Tear strength: 15 N/mm$^2$; Expansion at break: 500%; Time of malleability: ~25 mins (at 25° C.); Cure time at 25° C.: ~3 hours The freshly mixed two component silicon material was added on to the base layer by manually brushing it on a thin filled circle. The inside of the attached tube (a couple mm into it) was also coated with silicone using a cotton swab, while making sure that the outside is not coated with silicone. This composite of base layer, tube, and silicon shape was cured at 60° C. for 1 h.

Afterwards, the top layer was printed onto the composite (leaving a pocket open, where the tube was attached) using Resin D. A 80×80×2.2 mm square was printed. The printhead moved at a speed of 1200 mm/min and extruded at 0.91 mm$^3$/mm. Bead spacing was set to 0.8 mm and a layer height of 1.1 mm. Two layers were printed, but leaving a 10×10 mm square void where the tube was previously attached. After the print of the top layer was finished the gap of the pocket was filled up by manually extruding Resin D on top of it, also sealing the attached tubing. The finished print was put into the oven for curing at 60° C. for 1 h.

The above-described 3D printed flat part made out of a Resin A base layer, a commercial PU tube, a silicon as internal support and a Resin D top layer can be pressurized with air resulting in an inflated bulb.

Example 7b: Printing of Urethane Thermosetting Material with Internal Support Example 7b was made following the experimental of Example 7a, but instead of attaching a commercial PU tube, attached a 3D printed tube (that was not sanded down).

Example 7c: Printing of Urethane Thermosetting Material with Internal Support Example 7c was made following the experimental of Example 7a, but Resin C has been used to print the base layer instead of using Resin A.

Example 7d: Printing of Urethane Thermosetting Material with Internal Support Example 7d was made following the experimental of Example 7c but with a bigger base square with 100×100×2.2 mm that was printed. The top-layer was also increased to these dimensions and a 10×10 mm pocket was left void, where the PU tube was attached. Also, instead connecting the filled circle directly to the tube, differently shape lines were brushed onto the base layer to demonstrate the possibility of creating air channels that are connected an inflatable geometry.

Example 7e: Printing of Urethane Thermosetting Material with Internal Support Example 7e was made following the experimental of Example 7b, but two sheets of wax paper (in the shape of a droplet) were placed on the base layer as internal support. The printed tube was attached in between the two pieces of paper. The two pieces of paper were taped together at their edges beforehand. The curing steps before printing the top layer were skipped.

Example 8: Printing with of Part with Multiple Overhangs

Figure 6A:
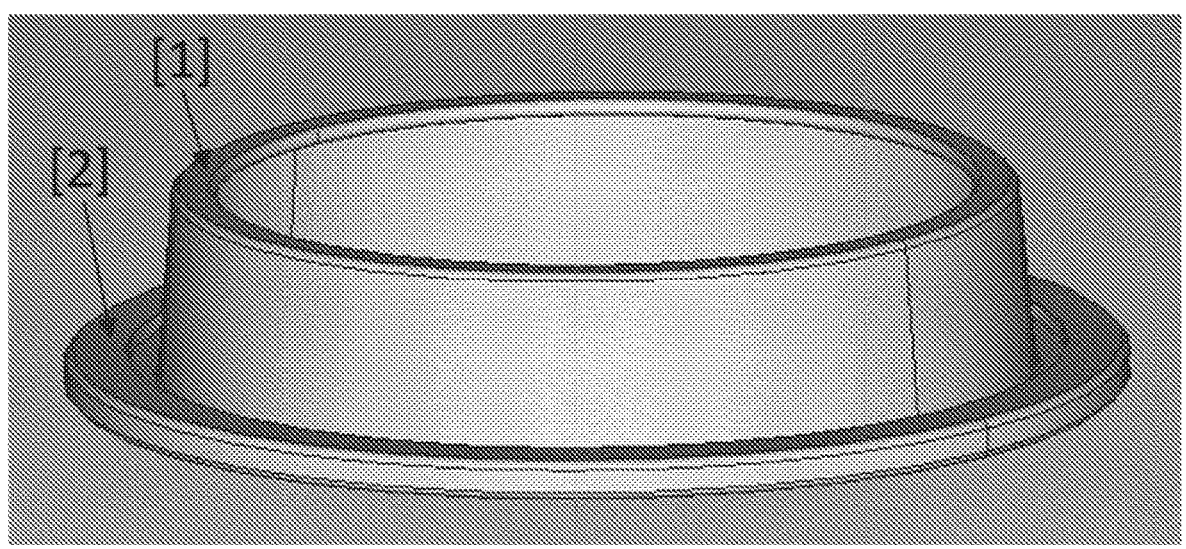
FIG. 6a depicts a part with multiple overhangs.
Figure 6B:
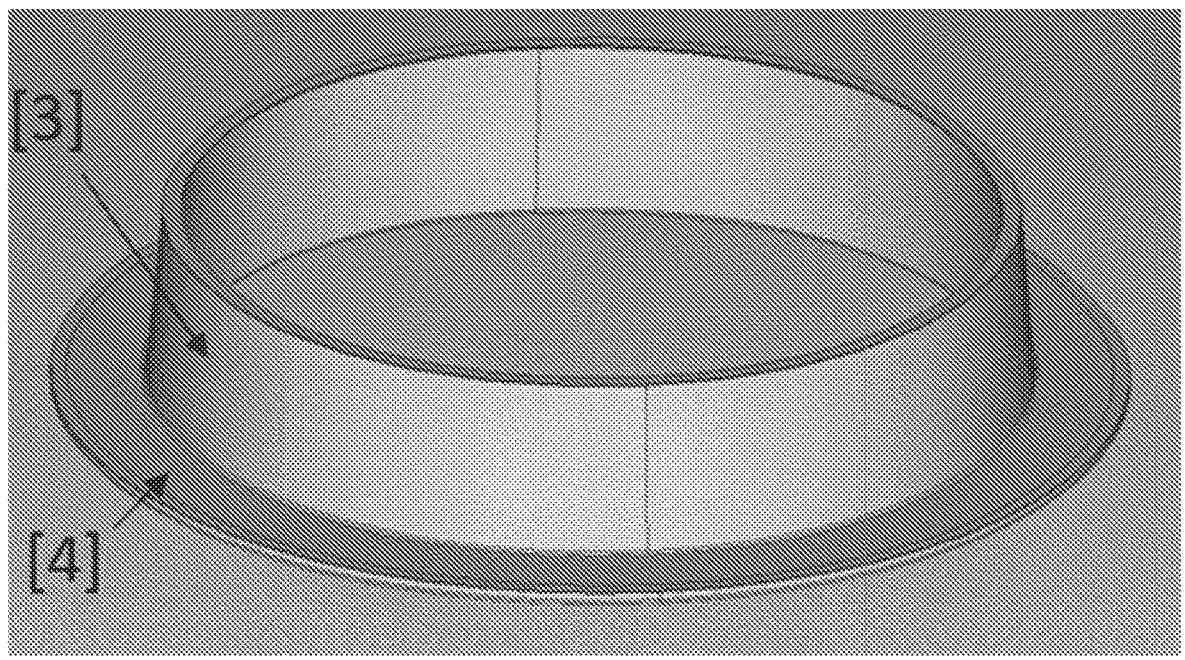
FIG. 6b depicts a part with multiple overhangs.

The part printed in Example 8 features three overhangs [1], [2] and [3], as well as base [4] (FIG. 6a and FIG. 6b).

Figure 6C:
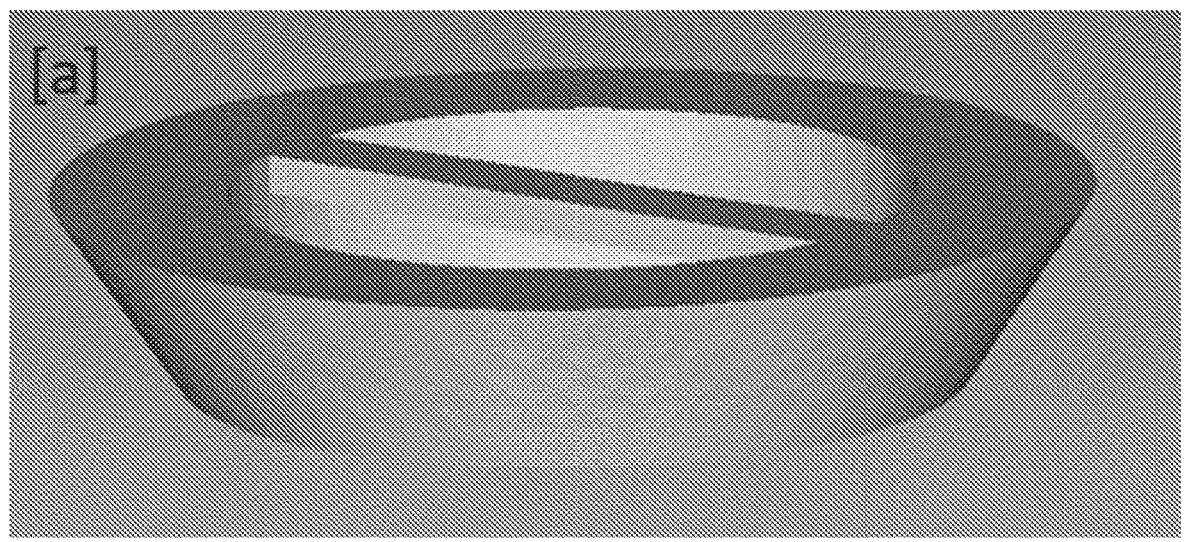
FIG. 6c depicts an overhang support.
Figure 6D:
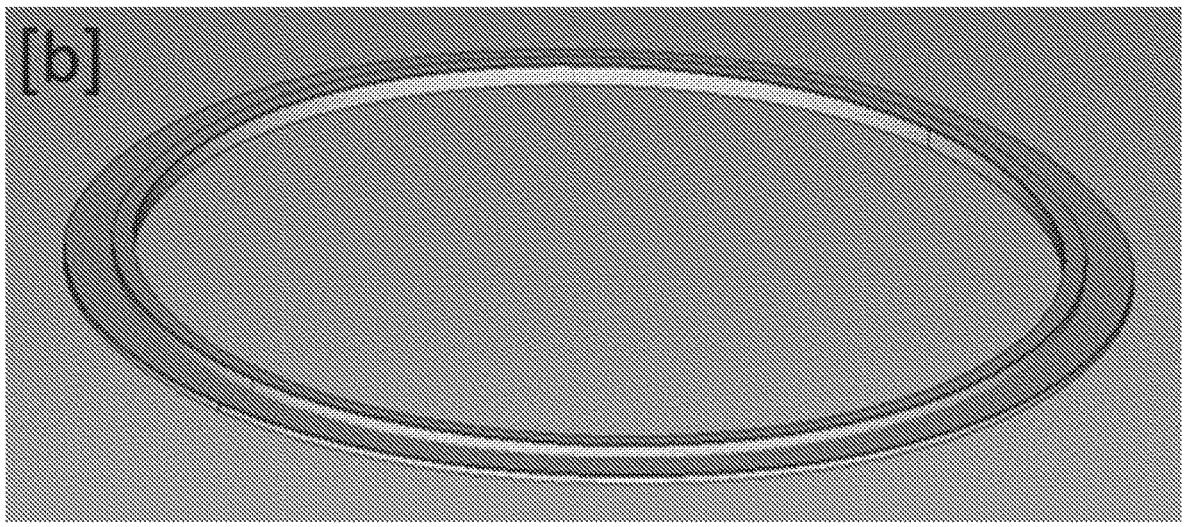
FIG. 6d depicts an overhang support.

To prepare for the print, supports [a] (FIG. 6c) and [b] (FIG. 6d) were printed prior to printing the part out of urethane thermosetting material. Polylactic acid support material was printed using an Ultimaker FFF printer. The supports were coated with "Mann Ease Release™ 2831 Mold Release."

Urethane thermosetting material was printed with a JuggerBot printer using dual viscotec pumps and a Sulzer static mixer.

Using Resin A and spiraling inwards base [4] was printed first. The bead spacing was 0.8 mm. The printhead moved at a speed of 1800 mm/min and extruded at a rate of 0.91 mm$^3$/mm. The layer height was 1.0 mm. Base [4] consisted of 2 layers.

Overhang [3] featured a 5 degree overhang and was printed without support. Using Resin A, the overhang was printed at a movement speed of 700 mm/min and an extrusion rate of 2.0 mm$^3$/mm. A single bead per layer was printed at a layer height of 1.05 mm and 22 layers total. The printhead spiraled upwards and inwards in a fashion that represents the 5 degree incline.

Support [a] was placed in the middle of the ring and small spacers (1, 2, or 3 mm high PLA blocks) were used to bring the upper surface of support [a] to the level of overhang [3] allowing for overhang [1] to be printed on top. Support [b] was placed on top of base [4] allowing for overhang [2] to be printed on top.

Using Resin A, overhang [1] was printed at a movement speed of 1800 mm/min at an extrusion rate of 0.91 mm$^3$/mm with a bead spacing of 0.8 mm and a layer height of 1.05 mm. Two layers were printed.

Using Resin A, a ring was printed on top of base [4] and around support [b]. The printhead moved at a speed of 700 mm/min and extruded at 1.8 mm$^3$/mm at a layer height of 1.35 mm. A single bead and layer was printed.

Using Resin A, overhang [3] was printed on top of support [b] and was connected to the part by printing on top of the single bead ring around support [b]. The printhead moved at a speed of 1800 mm/min extruding at a rate of 0.91 mm$^3$/mm with a layer height of 1.05 mm. Two layers were printed.

After 2 hours at room temperature, the urethane part was peeled from the support material.

Example 9: Printing with of Part with Multiple Internal and External Wax Supports Urethane thermosetting material was printed with a German RepRap printer using dual viscotec pumps and a Sulzer static mixer.

Figure 7A:
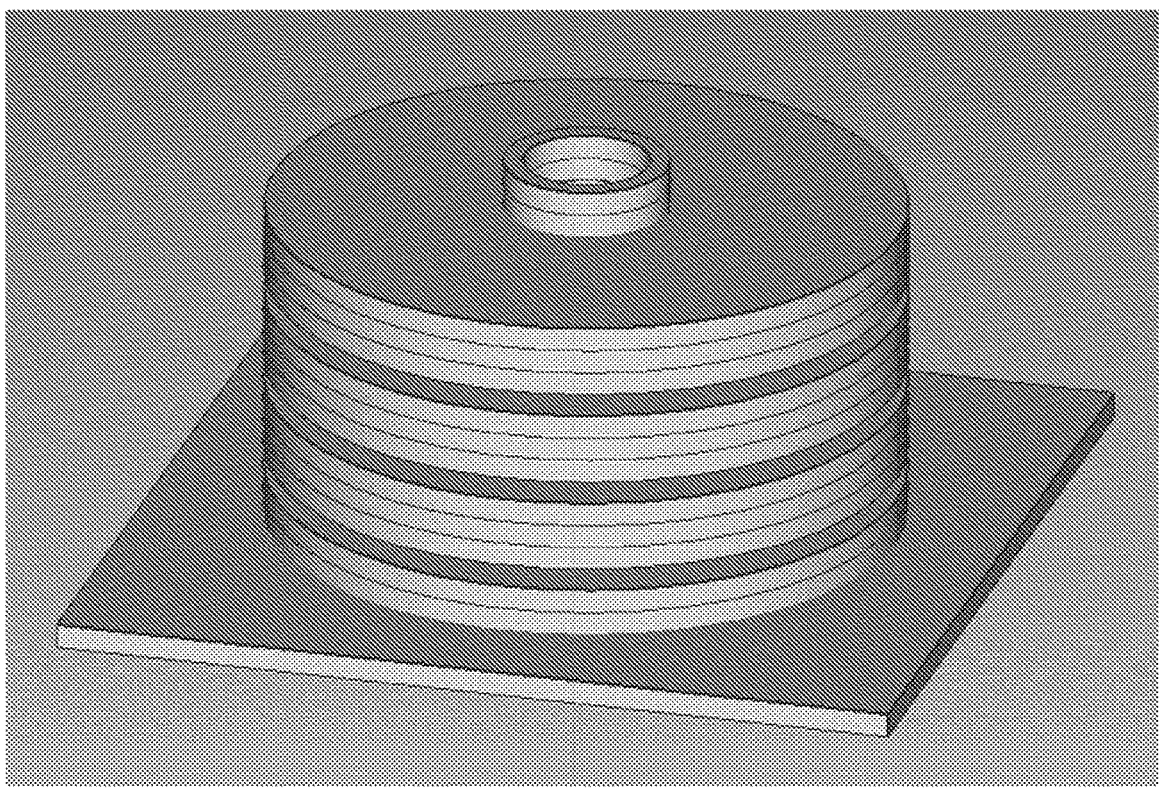
FIG. 7a depicts a part with multiple overhangs and multiple internal and external wax supports.
Figure 7B:
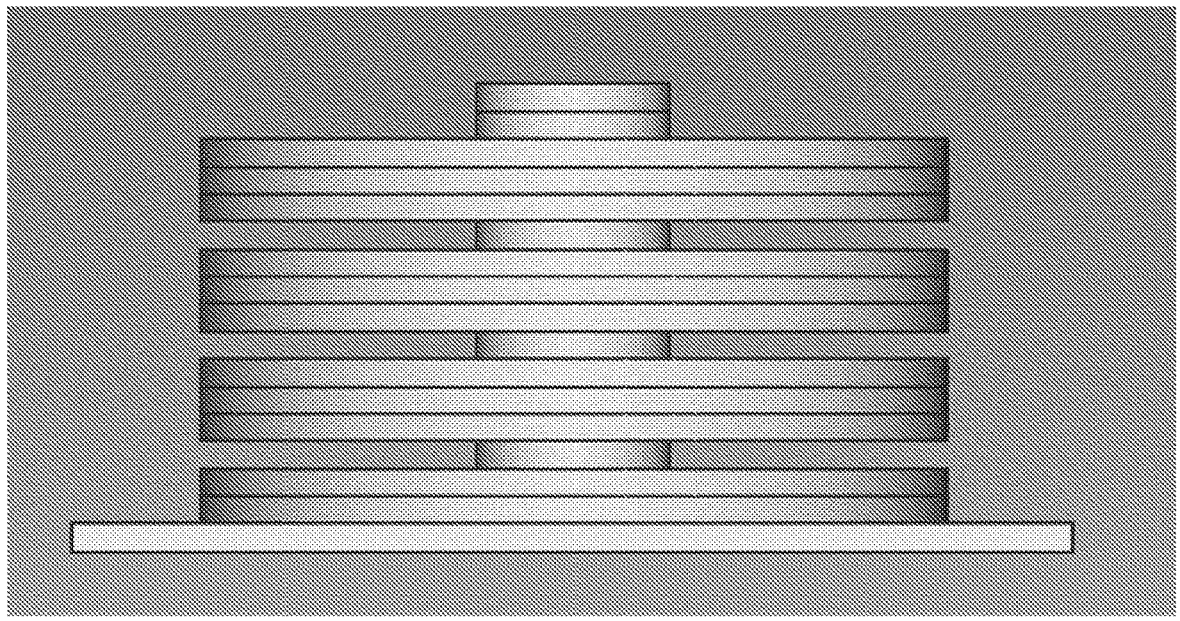
FIG. 7b depicts a part with multiple overhangs and multiple internal and external wax supports.
Figure 7C:
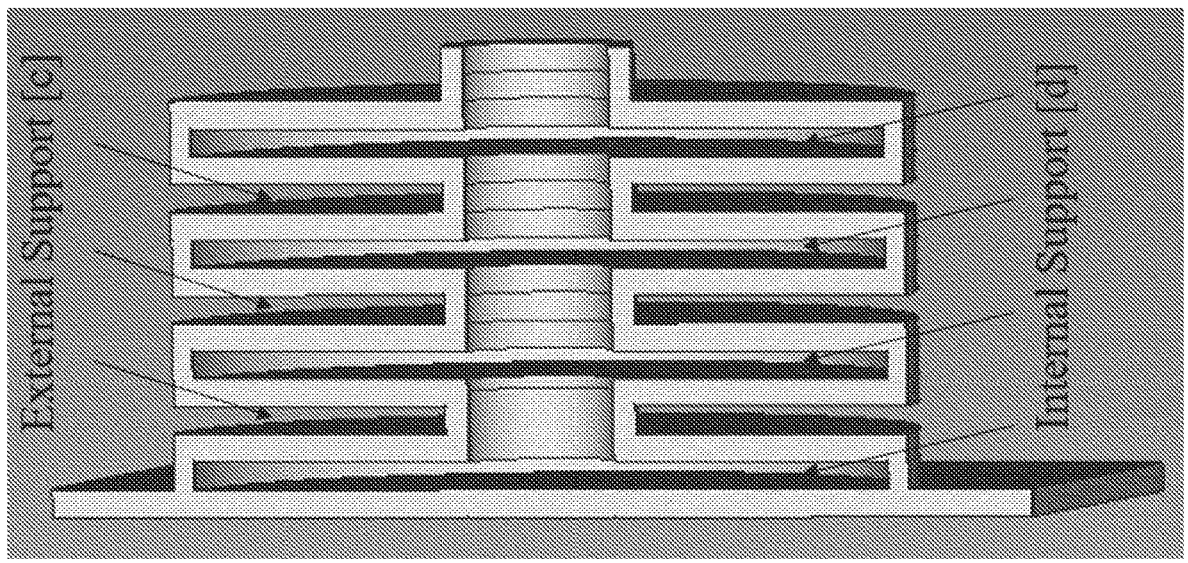
FIG. 7c depicts a cross-section of a part with multiple overhangs and multiple internal and external wax supports.

The part printed in Example 9 shown in FIG. 7a and another view in FIG. 7b was printed by using multiple wax plates as internal [d] and external supports [c] (FIG. 7c).

The circular wax plates were molded to fit and support into the spaces shown in FIG. 7c. Four internal supports [d] and three external supports [c] were prepared before starting to print.

Using Resin A, the part was printed in the dimensions described layer by layer in Table 4. All layers were centered on the layer below. After printing specific layers, internal or external wax supports were added (shown in the support column). The plates were pressed to align with the height of the ring. Before continuing to print with urethane thermoset material, a Z height offset was determined. ID is inner diameter and OD is outer diameter.

TABLE 4

Print settings for Example 9

| Layer | Dimension [mm] | Speed [mm/min] | Extrusion [mm$^3$/mm] | Bead spacing [mm] | Layer height [mm] | Support |
|---|---|---|---|---|---|---|
| 1 | Square: 80 × 80 | 1200 | 0.91 | 0.8 | 1.1 | — |
| 2 | Square: 80 × 80 | 1200 | 0.91 | 0.8 | 1.1 | — |
| 3 | Ring: OD: 60 ID: 53 | 1800 | 0.91 | 0.8 | 1.1 | — |
| 4 | Ring: OD: 60 ID: 53 | 1800 | 0.91 | 0.8 | 1.1 | internal |
| 5 | Ring: OD: 60 ID: 10 | 1800 | 0.91 | 0.8 | 1.1 | — |
| 6 | Ring: OD: 60 ID: 10 | 1800 | 0.91 | 0.8 | 1.1 | — |
| 7 | Ring: OD: 17 ID: 10 | 400 | 0.91 | 0.8 | 1.1 | — |
| 8 | Ring: OD: 17 ID: 10 | 400 | 0.91 | 0.8 | 1.1 | external |
| 9 | Ring: OD: 60 ID: 10 | 1800 | 0.91 | 0.8 | 1.1 | — |
| 10 | Ring: OD: 60 ID: 10 | 1800 | 0.91 | 0.8 | 1.1 | — |
| 11 | Ring: OD: 60 ID: 10 | 1800 | 0.91 | 0.8 | 1.1 | — |
| 12 | Ring: OD: 60 ID: 53 | 1800 | 0.91 | 0.8 | 1.1 | internal |
| 13 | Ring: OD: 60 ID: 10 | 1800 | 0.91 | 0.8 | 1.1 | — |
| 14 | Ring: OD: 60 ID: 10 | 1800 | 0.91 | 0.8 | 1.1 | — |
| 15 | Ring: OD: 17 ID: 10 | 400 | 0.91 | 0.8 | 1.1 | — |
| 16 | Ring: OD: 17 ID: 10 | 400 | 0.91 | 0.8 | 1.1 | external |
| 17 | Ring: OD: 60 ID: 10 | 1800 | 0.91 | 0.8 | 1.1 | — |
| 18 | Ring: OD: 60 ID: 10 | 1800 | 0.91 | 0.8 | 1.1 | — |
| 19 | Ring: OD: 60 ID: 53 | 1800 | 0.91 | 0.8 | 1.1 | — |
| 20 | Ring: OD: 60 ID: 53 | 1800 | 0.91 | 0.8 | 1.1 | internal |
| 21 | Ring: OD: 60 ID: 10 | 1800 | 0.91 | 0.8 | 1.1 | — |

TABLE 4-continued

Print settings for Example 9

| Layer | Dimension [mm] | Speed [mm/min] | Extrusion [mm³/mm] | Bead spacing [mm] | Layer height [mm] | Support |
|---|---|---|---|---|---|---|
| 22 | Ring: OD: 60 ID: 10 | 1800 | 0.91 | 0.8 | 1.1 | — |
| 23 | Ring: OD: 17 ID: 10 | 400 | 0.91 | 0.8 | 1.1 | — |
| 24 | Ring: OD: 17 ID: 10 | 400 | 0.91 | 0.8 | 1.1 | external |
| 25 | Ring: OD: 60 ID: 10 | 1800 | 0.91 | 0.8 | 1.1 | — |
| 26 | Ring: OD: 60 ID: 10 | 1800 | 0.91 | 0.8 | 1.1 | — |
| 27 | Ring: OD: 60 ID: 53 | 1800 | 0.91 | 0.8 | 1.1 | — |
| 28 | Ring: OD: 60 ID: 53 | 1800 | 0.91 | 0.8 | 1.1 | internal |
| 29 | Ring: OD: 60 ID: 10 | 1800 | 0.91 | 0.8 | 1.1 | — |
| 30 | Ring: OD: 60 ID: 10 | 1800 | 0.91 | 0.8 | 1.1 | — |
| 31 | Ring OD: 17 ID: 10 | 400 | 0.91 | 0.8 | 1.1 | — |
| 32 | Ring: OD: 17 ID: 10 | 400 | 0.91 | 0.8 | 1.1 | — |
| 33 | Ring: OD: 17 ID: 10 | 400 | 0.91 | 0.8 | 1.1 | — |
| 34 | Ring: OD: 17 ID: 10 | 400 | 0.91 | 0.8 | 1.1 | — |

After finishing the print, the part was placed upside down over a glass beaker in an oven at 110° C. for 2.5 hours until wax supports were melted away. The urethane thermoset material cured during this time. The part could be put under pressurized air causing it to elongate along the z-axis.

Example 10: Resins Useful for Embodiments of the Printing Process

Resins useful for embodiments of the printing process include but are not limited to the following:

| Resin | % NCO of A side | Ratio A:B | Viscosity A (cps) | Viscosity B (cps) | Chain extender |
|---|---|---|---|---|---|
| A | 9% | 1:1 | 95,000 (25 C.) | 32000 (80 C.) | 5% E100, 8.1% E300 |
| B | 13.1% | 1:1 | 2000 (80 C.) | 70000 (80 C.) | 4% E100, 20.1% E300 |
| C | 6% | 1:1 | 90000 (25 C.) | 50000 (25 C.) | 6.5% E100 |
| D | 9% | 1:1 | 24000 (25 C.) | 2500 (25 C.) | 4.75% E100 |
| E | 10.6% | 1:1 | <10,000 (25 C.) | <10000 (25 C.) | 13% E300 |
| F | 6% | 1:1 | 90000 (25 C.) | 50000 (25 C.) | 7.5% E100 |

Prepolymers were prepared by addition of a polyether polyol mixture to MDI to achieve the desired % NCO and viscosity.

B sides were prepared from a polyether polyol mixture, a thickening agent, and a low molecular weight amine chain extender (E100 or E300) to achieve the desired viscosity and stoichiometric ratio.

What is claimed is:

1. A three-dimensional (3D) object production process comprising:
  providing a thermoset printing apparatus comprising:
    a mixing chamber to receive and mix at least a first reactive component and a second reactive component to provide a thermosetting material,
    an extrusion nozzle to deliver the thermosetting material to form a 3D object,
    at least one actuator coupled to the extrusion nozzle to move the extrusion nozzle when delivering the thermosetting material to form the 3D object, and
    a controller comprising one or more processors and coupled to the extruded thermoset printing apparatus, and
  depositing the thermosetting material from the extrusion nozzle in the form of one or more beads to form the 3D object having a profile,
  wherein the depositing comprises (a) applying a minimum residence time of 5 seconds or a maximum flow rate of 3.0 g/minute through the mixing chamber or a minimum time per layer, (b) depositing a first layer of the thermosetting material and (c) depositing a second layer of the thermosetting material, wherein the beads of the thermosetting material in the second layer are offset in a horizontal direction from the beads of the thermosetting material in the first layer to form an unsupported overhang having a first overhang angle during printing of the bead of at least about 10 degrees, wherein the first overhang angle is an angle of the profile from the second layer to the first layer directly below the second layer relative to a vertical direction, and wherein the residence time or the flow rate through the mixing chamber are optimized to obtain a desired unsupported first overhang angle.

2. The 3D object production process according to claim 1, comprising depositing a third layer of thermosetting material, wherein the beads of thermosetting material in the third layer are offset from the beads of thermosetting material in the second layer to form an unsupported overhang during printing of the bead having a second overhang angle, wherein the overhang angle is an angle of the profile from the third layer to the second layer directly below the third layer relative to a vertical direction, and wherein the residence time or the flow rate through the mixing chamber are optimized to obtain a desired unsupported second overhang angle.

3. The 3D object production process according to claim 1, wherein a time per layer of the thermosetting material is from 1 to 80 seconds.

4. The 3D object production process according to claim 1, wherein a time per layer of the thermosetting material is from 1 to 50 seconds.

5. The 3D object production process according to claim 1, wherein a time per layer of the thermosetting material is from 1 to 30 seconds.

6. The 3D object production process according to claim 1, wherein a time per layer of the thermosetting material is from 1 to 20 seconds.

7. The 3D object production process according to claim 1, wherein a time per layer of the thermosetting material is about 10 seconds.

8. The 3D object production process according to claim 1, wherein the beads of thermosetting material in the second layer are about 1% to about 75% offset from the beads of thermosetting material in the first layer.

9. The 3D object production process according to claim 1, wherein the beads of thermosetting material in the second layer are about 10% to about 60% offset from the beads of thermosetting material in the first layer.

10. The 3D object production process according to claim 1, wherein a portion of the 3D object comprises an unsupported overhang of at least about 30 degrees.

11. The 3D object production process according to claim 1, wherein a portion of the 3D object comprises an unsupported overhang of at least about 50 degrees.

12. The 3D object production process according to claim 1, wherein a portion of the 3D object comprises an unsupported overhang of at least about 60 degrees.

13. The 3D object production process according to claim 1, wherein a portion of the 3D object comprises an unsupported overhang of at least about 70 degrees.

14. The 3D object production process according to claim 1, wherein a portion of the 3D object comprises an unsupported overhang of at least about 80 degrees.

15. The 3D object production process according to claim 1 comprising applying a maximum volumetric flow rate per distance traveled by the extrusion nozzle of about 0.004 g/mm.

16. The 3D object production process according to claim 1, wherein (a) a time per layer of the thermosetting material is from 1 to 20 seconds and (b) the minimum residence time is about 10 seconds or the maximum flow rate through the mixer is about 1.8 g/minute.

17. The 3D object production process according to claim 1, wherein the first reactive component comprises an isocyanate content from about 2% to about 20%.

18. The 3D object production process according to claim 1, wherein the first reactive component has a viscosity from about 1000 cps at 25° C. to about 120,000 cps at 80° C.

19. The 3D object production process according to claim 1, wherein the second reactive component has a viscosity from about 1000 cps at 25° C. to about 120,000 cps at 80° C.

20. The 3D object production process according to claim 1, wherein the second reactive component comprises an amine content of from about 3% to about 15%.

* * * * *